United States Patent [19]
Clark et al.

[11] Patent Number: 5,522,014
[45] Date of Patent: May 28, 1996

[54] INTERGRATED QUALITATIVE/QUANTITATIVE REASONING WITH ENHANCED CORE PREDICTIONS AND EXTENDED TEST PROCEDURES FOR MACHINE FAILURE ISOLATION USING QUALITATIVE PHYSICS

[75] Inventors: Robert T. Clark, Enfield; Thomas P. Hamilton, South Windsor; Steven Gallo, Vernon, all of Conn.

[73] Assignee: United Technologies Corporation, Stratford, Conn.

[21] Appl. No.: 233,280

[22] Filed: Apr. 26, 1994

[51] Int. Cl.⁶ .................................................. G06F 15/00
[52] U.S. Cl. ..................... 395/10; 364/551.02; 395/911; 395/912
[58] Field of Search ............................. 395/10, 51, 911, 395/912, 914, 915; 364/551.01, 551.02

[56] References Cited

U.S. PATENT DOCUMENTS

| | | | |
|---|---|---|---|
| 4,649,515 | 3/1987 | Thompson et al. | 364/900 |
| 4,766,534 | 8/1988 | De Benedictis | 364/200 |
| 4,837,735 | 6/1989 | Allen, Jr. et al. | 364/513 |
| 4,868,763 | 9/1989 | Masui et al. | 364/513 |
| 4,901,229 | 2/1990 | Tashiro et al. | 364/200 |
| 4,914,586 | 4/1990 | Swinehart et al. | 364/200 |
| 4,939,680 | 7/1990 | Yoshida | 364/513 |
| 4,965,882 | 10/1990 | Barabash et al. | 364/513 |
| 5,138,694 | 8/1992 | Hamilton | 395/10 |
| 5,150,367 | 9/1992 | Tong et al. | 371/23 |
| 5,161,158 | 11/1992 | Chakravarty | 371/15.1 |
| 5,187,773 | 2/1993 | Hamilton et al. | 395/10 |
| 5,272,704 | 12/1993 | Tong et al. | 371/23 |

OTHER PUBLICATIONS

W. R. Simpson et al., "POINTER—An Intelligent Maintenance Aid", *AUTOTESTCON '89*, (Sep. 1989), pp. 26–31.

M. F. Chang et al., "Optimal Wafer Probe Testing and Diagnosis of K–out–of–N Structures", *Proc. IEEE 1989 Int'l. Conf. Computer–Aided Design*, (Nov. 1989), pp. 238–241.

Y. Ishida, "Qualitative Expressions of Changes", *Proc. 1991 Int'l. Conf. Industrial Electronics, Control, and Instrumentation*, (Oct. 1991), pp. 1657–1662.

W. R. Simpson and J. W. Sheppard, "Fault Isolation in an Integrated Diagnostic Environment", *IEEE Design and Test of Computers*, (Mar. 1993), pp. 52–66.

Xudong Yu, et al., "A Multi–Level Diagnosis Methodology for Complex Systems", *Proceedings of the Eighth Conference On Artificial Intelligence for Applications*, 2 Jun. 1992–6 Jun. 1992, Monterey, CA, US.

P. M. McCown, et al., "Auxiliary Power Unit Maintenance Aid–Flight Line Engine Diagnostics", *Autotestcon '89 Conference Record*, 25 Sep. 1989–28 Sep. 1989, Philadelphia, PA, US.

*The Handbook of Artificial Intelligence*, vol. 4, Chapt. XXI, "Qualitative Physics," pp. 325–413 (Dec. 1989).

Davis, "Diagnostic Reasoning Based on Structure and Behavior," *Artificial Intelligence*, No. 24, pp. 347–410 Elsevier Science (1984).

De Kleer and Williams, "Diagnosing Multiple Faults," *Artificial Intelligence*, No. 32, pp. 97–130, Elsevier Science (1987).

(List continued on next page.)

*Primary Examiner*—Robert W. Downs
*Attorney, Agent, or Firm*—Foley, Hoag & Eliot

[57] ABSTRACT

The presence of particular faults in a machine is determined using constraint suspension and Qualitative Physics by estimating a time for performance for each of a plurality of machine test procedures and providing a summation, for each test procedure, of estimated times for performing portions of each of the test procedures. Portions of the machine test procedures which are unnecessary due to a present test configuration of the machine are not included in the summation. A particular test procedure is chosen from the group of machine test procedures by selecting the one of the machine test procedures having a highest test score where the test score varies inversely to the summation. The test procedure can be a component health assessment and/or an observation of a machine parameter.

19 Claims, 12 Drawing Sheets

OTHER PUBLICATIONS

Kuipers, "Commonsense Reasoning about Causality: Deriving Behavior from Structural," *Artificial Intelligence*, No. 24, pp. 169–203, Elsevier Science (1984).

Hamilton, "HELIX: A Helicopter Diagnostic System Based on Qualitative Physics," *Computational Mechanics Publications* (1988).

De Kleer and Brown, "The Origin, Form and Logic of Qualitative Physical Laws," *Proceedings 8th IJCAI West Germany*, pp. 1158–1169 (1983).

Hamilton and Jacobsen, "Reasoning About Device Behavior Using Qualitative Physics," American Helicopter Society National Specialists'Meeting, Automation Applications for Rotorcraft, Atlanta, GA, pp. 1–16 (Apr. 4–6, 1988).

De Kleer and Brown, "A Qualitative Physics Base on Confluences," *Artificial Intelligence*, pp. 7–83 (Dec. 24, 1984).

Glenn, "Application of Constraint Suspension Techniques to Diagnosis in Helicopter Caution/Warning Systems," American Helicopter Society National Specialists' Meeting on Automation Applications for Rotorcraft, Atlanta, GA (Apr. 4–6, 1988).

Ishida, "An Application of Qualitative Reasoning to Process Diagnosis: Automatic Rule Generation by Qualitative Simulation," *Proceedings The Fourth Conference on Artificial Intelligence Applications*, IEEE, San Diego, California, pp. 124–129, (Mar. 14–18, 1983).

McKeon and Wakeling, "Fault Diagnosis in Analogue Circuits Using AI Techniques," *Proceedings International Test Conference 1989*, IEEE Computer Society, Washington, DC, pp. 118–123, (Aug. 29–31, 1989).

Hamscher and Davis, "Issues in Model Based Troubleshooting," *Artificial Intelligence Memo 893*, Massachusetts Institute of Technology, pp. 1–27, (Mar. 1987).

Hyvonen, "Constraint Reasoning Based on Internal Arithmetic: The Tolerance Propagation Approach," *Artificial Intelligence*, Elsevier Science, No. 58, pp. 71–112, (1992).

Ladkin and Reinefeld, "Effective Solution of Qualitative Interval Constraint Problems," *Artificial Intelligence*, Elsevier Science, No. 57, pp. 105–124 (1992).

Kumar, "Algorithms for Constraint–Satisfaction Problems: A Survey," *AI Magazine*, Spring, 1992, pp. 32–44.

Williams, "A Theory of Interactions: Unifying Qualitative and Quantitative Algebraic Reasoning," *Artificial Intelligence*, No. 51, pp. 39–94, Elsevier Science (1991).

Simmons, "Commonsense Arithmetic Reasoning," *Science*, pp. 118–124 (Aug., 1986).

Lackinger and Obreja, "Model–Based Troubleshooting of Complex Technical Systems Using Integrated Qualitative Techniques," pp. 122–129, IEEE (1991).

Shirley and Davis, "Generating Distinguishing Tests Based on Hierarchical Models and Symptom Information," IEEE, pp. 455–458 (1983).

Sun and Weld, "A Framework for Model–Based Repair," pp. 182–187 (Jul. 1993).

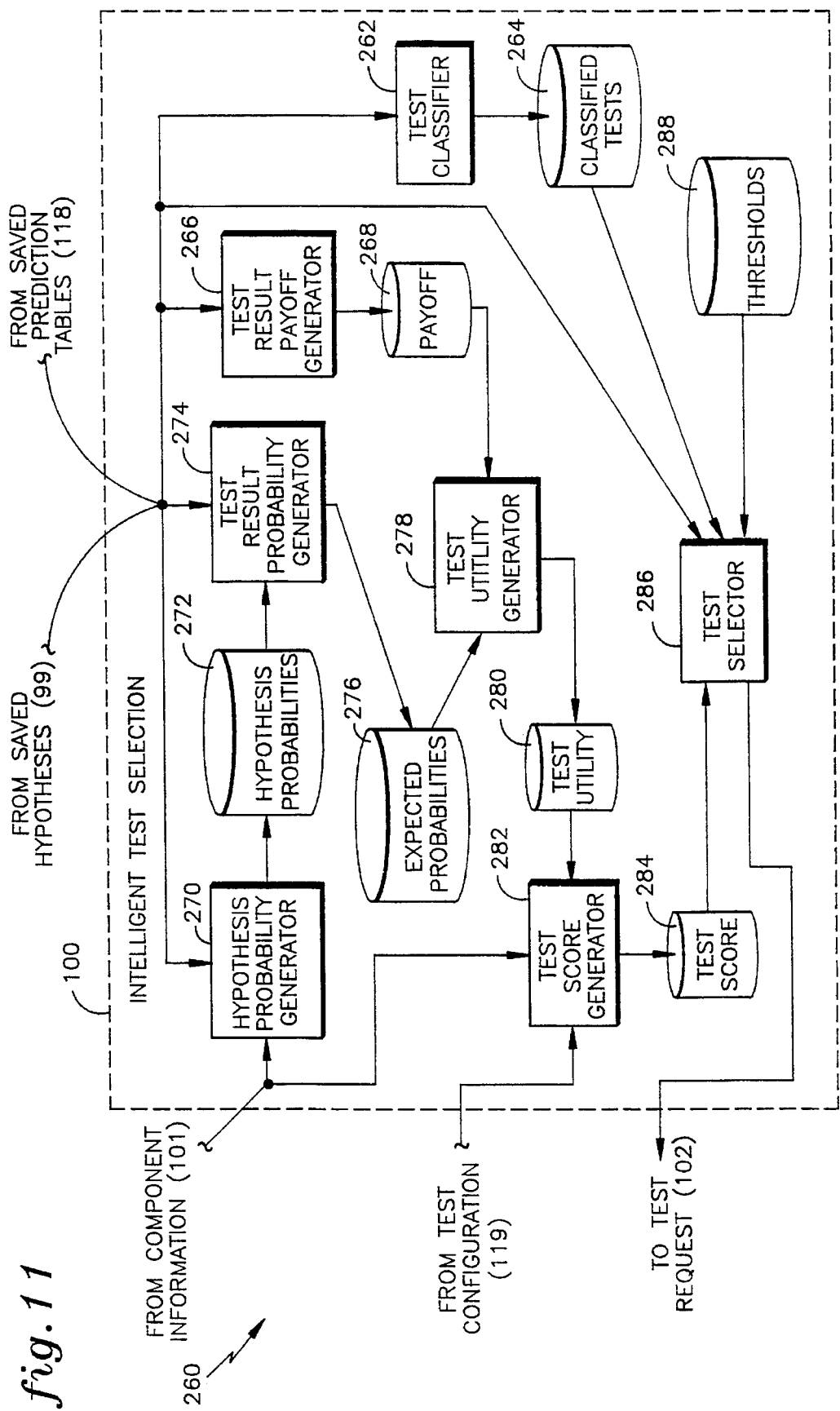

INTERGRATED QUALITATIVE/QUANTITATIVE REASONING WITH ENHANCED CORE PREDICTIONS AND EXTENDED TEST PROCEDURES FOR MACHINE FAILURE ISOLATION USING QUALITATIVE PHYSICS

TECHNICAL FIELD

This invention relates to the field of computer software and more particularly to the field of artificial intelligence computer software.

BACKGROUND ART

It is often the case that the symptoms of a machine failure indicate a number of alternative explanations. Usually it is more cost effective and less time consuming to observe the machine in more detail in order to rule out some of the alternative explanations, rather than repairing and/or replacing all possible candidates. The process of iteratively observing the machine and ruling out potential causes of machine failure is called "failure isolation".

Failure isolation can be performed manually with the aid of a fault tree, a flowchart-like representation of the iterative test/elimination steps of failure isolation. Each element of the fault tree requests a user to make a particular observation. Extending from each element is a plurality of branch paths, each of which leads to a different portion of the fault tree. The user follows a particular branch path based on the results of the test requested by the current element. At some point in the process, the user will reach an element, having no branches extending therefrom, indicating the particular component or group of components which have failed.

For very large and complex machines, a fault tree can run on to many pages and perhaps to multiple volumes, thereby rendering the fault tree difficult to traverse. One solution is to use a computer having therein a rule based failure isolation system, a program that contains the information from the fault tree. The computer directs the user to perform tests and enter the results.

However, for both a fault tree and for a rule based failure isolation system, all of the possible failure modes which a user may encounter need to be determined at the time of creation. While this may not be difficult for simple machines, it may be impossible or at least extremely impractical for more complex machines. It is not uncommon for either a fault tree designer or a rule based failure isolation system programmer to omit some of the failure modes of a machine. This omission is either inadvertent due to the enormity of the task or is an intentional decision to maintain the size below a practical limit.

A solution to the inability of either fault trees or rule base failure isolation systems to isolate every conceivable failure can be found in Davis, Randall "Diagnostic Reasoning Based on Structure and Behavior", *Artificial Intelligence*, 24 (1984), 347–410. Davis proposes a failure isolation system called "constraint suspension", wherein a computer generates a plurality of models of the machine. Each of the models assumes a different failed component or group of failed components. The model which is consistent with the test results indicates which component or group of components have failed.

A drawback to constraint suspension is that modeling complex machines having many analog quantities is very processor intensive and the amount of time it takes to run the system becomes prohibitive. A solution to this is found in a paper, "HELIX: A Helicopter Diagnostic System Based on Qualitative Physics", Hamilton, Thomas P., International Journal of Artificial Intelligence in Engineering, Vol. 3, No. 3 July, 1988, pp 141–150. Hamilton suggests coupling constraint suspension with qualitative physics, a modeling technique wherein analog quantities are represented as variables which can take on a finite set of values. Each of the finite qualitative values represents a different range of the analog quantity. However, the Hamilton paper does not contain sufficient detail to enable one skilled in the art to make and use a qualitative physics failure isolation system.

SUMMARY OF INVENTION

According to the present invention, the presence of particular faults in a machine is determined by estimating a time for performance for each of a plurality of machine test procedures by providing a summation, for each test procedure, of estimated times for performing portions of each of the test procedures, where portions of the machine test procedures which are unnecessary due to a present test configuration of the machine are not included in the summation, choosing a particular test procedure from the group of machine test procedures by selecting the one of the machine test procedures having a highest test score, said test score being inversely proportional to said summation, prompting a user to perform the particular test procedure and provide results thereof, generating a plurality of pending hypotheses wherein each hypothesis has associated therewith a set of confluences using variables and equations to describe operation of components of the machine which are assumed not to have failed, propagating values indicative of the test results through the confluences to produce a set of predictions for values of confluence variables, discarding hypotheses which produce an inconsistent set of predictions, saving hypotheses which produce a consistent set of predictions, and indicating the presence of one or more particular machine faults in response to there remaining a single hypothesis corresponding to failure of one or more particular machine components. The user can be prompted to perform a component health assessment and enter the results, perform an observation of a machine parameter and enter the results, or some combination thereof.

According further to the present invention, the presence of particular faults in a machine is determined by prompting a user to perform one of a plurality of machine test procedures and provide results thereof to the processor, the test procedure being a generic template that is applied to either a specific component or to a specific parameter, generating a plurality of pending hypotheses having associated therewith a set of confluences using variables and equations to describe operation of components of the machine which are assumed not to have failed, propagating values indicative of the test results through the confluences to produce a set of predictions for values of confluence variables, discarding hypotheses which produce an inconsistent set of predictions, saving hypotheses which produce a consistent set of predictions, and indicating the presence of one or more particular machine faults in response to there remaining a single hypothesis corresponding to failure of one or more particular machine components.

According further to the present invention, the presence of particular faults in a machine is determined by receiving machine signals indicative of machine test procedure results, generating a first set of pending hypotheses having associated therewith a set of confluences using variables and equations to describe operation of components of the machine which are assumed not to have failed, propagating the machine signals through the confluences to produce a set of predictions for values of confluence variables of a particular hypothesis by selecting a subset of the variables that are unrestricted and partially restricted confluence variables of the hypothesis, temporarily assigning possible qualitative values to each variable of the subset to determine if one or more of the possible qualitative values results in a consistent set of predictions for the particular hypothesis, and restricting each variable of the subset to values which produce a consistent set of predictions. Hypotheses which produce an inconsistent set of predictions are discarded and hypotheses which produce a consistent set of predictions are saved. The presence of one or more particular machine faults is detected when there remains a single hypothesis corresponding to failure of one or more particular machine components. Selecting can include examining the unrestricted and partially restricted variables of the particular hypothesis and selecting variables that satisfy at least one of the following conditions: the variable appears in a precondition of a confluence, the variable appears in an unconditional confluence containing greater than two unrestricted or partially restricted variables, and the variable appears in a confluence postcondition with more than two unrestricted or partially restricted variables. Additional pending hypotheses having associated therewith a set of confluences using variables and equations to describe operation of components of the machine which are assumed not to have failed can be generated where the additional hypotheses correspond to substructure of at least one of the first set of hypotheses, where examining is only performed on variables of the additional hypotheses that do not appear in the at least one of the first set of hypotheses corresponding to the additional hypotheses. Values can be assigned to variables of the additional hypotheses, where the values are derived from values of corresponding variables from the at least one of the first set of hypotheses corresponding to the additional hypotheses. Selecting can also include examining additional variables of the additional hypotheses corresponding to variables from the at least one of the first set of hypotheses corresponding to the additional hypotheses, where the additional variables are either variables that have been restricted or recursive covariates thereof. Selecting can also include examining additional variables that are covariates of variables of the additional hypotheses that do not appear in the at least one of the first set of hypotheses corresponding to the additional hypotheses. Additional machine signals indicative of machine test procedure results can be received and only the variables and covariates thereof corresponding to the additional machine signals and implicants thereof are examined. The implicants of each value assigned to a variable of the subset of variables can be determined and the other variables of the hypothesis can be restricted according to a union of the implicants. Unrestricted and partially restricted variables that had been restricted on a most recent previous iteration can be examined. A hypothesis can be discarded in response to there being no possible values that can be assigned to a variable of the subset of variables of the hypothesis that results in a consistent set of predictions.

According further to the present invention, the presence of particular faults in a machine can be determined by receiving machine signals indicative of machine test procedure results, generating a first set of pending hypotheses having associated therewith a set of confluences using variables and equations to describe operation of components of the machine which are assumed not to have failed, assigning to confluence variables of a particular hypothesis values that correspond to the machine signals, propagating values for fully restricted and partially restricted confluence variables through the confluences to further restrict values of other variables of the confluences, discarding hypotheses which produce an inconsistent set of predictions, saving hypotheses which produce a consistent set of predictions, and indicating the presence of one or more particular machine faults in response to there remaining a single hypothesis corresponding to failure of one or more particular machine components.

According further to the present invention, the presence of particular faults in a machine can be determined by receiving machine signals indicative of machine test procedure results, generating a first set of pending hypotheses having associated therewith a set of confluences using variables and equations to describe operation of components of the machine which are assumed not to have failed, propagating the machine signals through the confluences to produce a set of predictions for values of confluence variables of a particular hypothesis, where the values of confluence variables are either a qualitative value, a quantitative value, or a combination of both, discarding hypotheses which produce an inconsistent set of predictions, saving hypotheses which produce a consistent set of predictions, and indicating the presence of one or more particular machine faults in response to there remaining a single hypothesis corresponding to failure of one or more particular machine components. A global landmark ordering can be used to correlate quantitative values and qualitative values of the confluence variables.

The foregoing and other objects, features and advantages of the present invention will become more apparent in light of the following detailed description of exemplary embodiments thereof, as illustrated in the accompanying drawings.

BRIEF DESCRIPTION OF DRAWINGS

FIG. 11 is a dataflow diagram illustrating operation of intelligent test selection software within the Qualitative Reasoning System software.

BEST MODE FOR CARRYING OUT THE INVENTION

Figure 1:
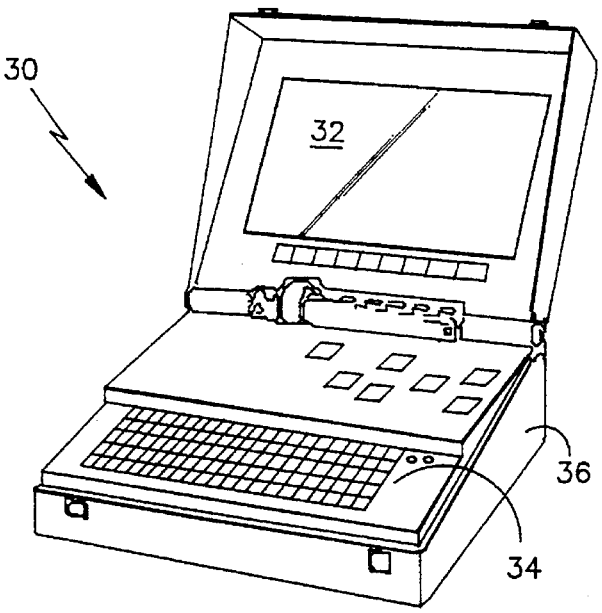
FIG. 1 is a perspective view of a Portable Maintenance Aid.

Referring to FIG. 1, a PMA (Portable Maintenance Aid) 30 has a display 32, a keyboard 34, and a processing unit 36. The PMA 30 is a portable computer manufactured by Grumman Electronic Systems Division of Bethpage N.Y., part #A31U18031-3. The display 32 is a seven inch by nine inch LCD (Liquid Crystal Display). The keyboard 34 is a QWERTY keyboard. The processing unit 36 contains a Sparcstation 1E circuit board, manufactured by Sun Microsystems, Inc. of Mountain View, Calif. The following brands/types of computers are also suitable for use as the PMA 30: the RSC-1X Rugged Sparc Portable Maintenance Aid engineered by SAIC of San Diego, Calif., the BriteLite IPC portable workstation manufactured by RDI Computer Corp. of San Diego, Calif., and the DECpc 560ST manufactured by Digital Equipment Corporation of Maynard, Mass. The PMA 30 can also optionally include a mouse to facilitate user input.

The PMA 30 is used to perform failure isolation of a machine, such as a helicopter electro-mechanical system. Failure isolation software, which is written in Common Lisp, is stored on a hard disk (not shown) located within the processing unit 36. The software allows the PMA 30 to interact with a user in order to perform machine failure isolation. The software uses the display 32 to prompt the user to perform tests on the machine. The user enters the results of the tests via the keyboard 34 or mouse (if available).

Tests allow failure isolation information to be communicated between the PMA 30 and the user. There are different types of tests such as observations and component health assessments. An observation is a physical description of the state of a particular portion of the machine, such as the voltage between two particular points or the observation that a particular switch is in the "ON" position while a particular indicator is "OFF". A component health assessment, on the other hand, is a description of the operable viability of a particular component of the machine, such as whether a specific wire is broken or whether a specific pipe is clogged. It is possible to combine the types of tests and prompt the user to make an observation and perform a component health assessment for the same test. Different types of tests, and distinctions therebetween, are discussed in more detail hereinafter.

Figure 2:
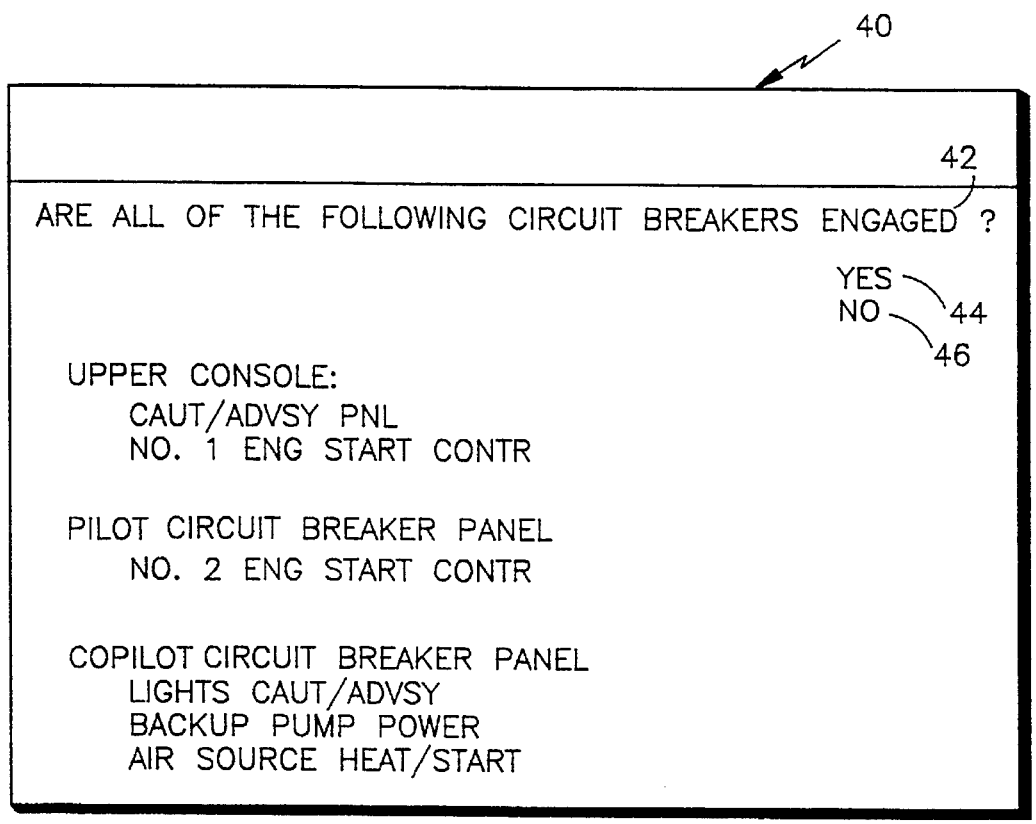
FIG. 2 illustrates a user prompt screen.

FIG. 2 illustrates a user prompt screen 40. The user is presented with a question 42 and a list of possible answers 44, 46. The question 42 used for this example requires a yes/no answer so the list of possible answers shown on the screen 40 contains just "YES" 44 or "NO" 46. The user employs the cursor keys (or mouse) to select one of the answers 44, 46 and then presses the return key to indicate to the software that an answer has been selected. Other user prompt screens may require the user to measure and enter a particular value or to perform a component health assessment.

Figure 3:
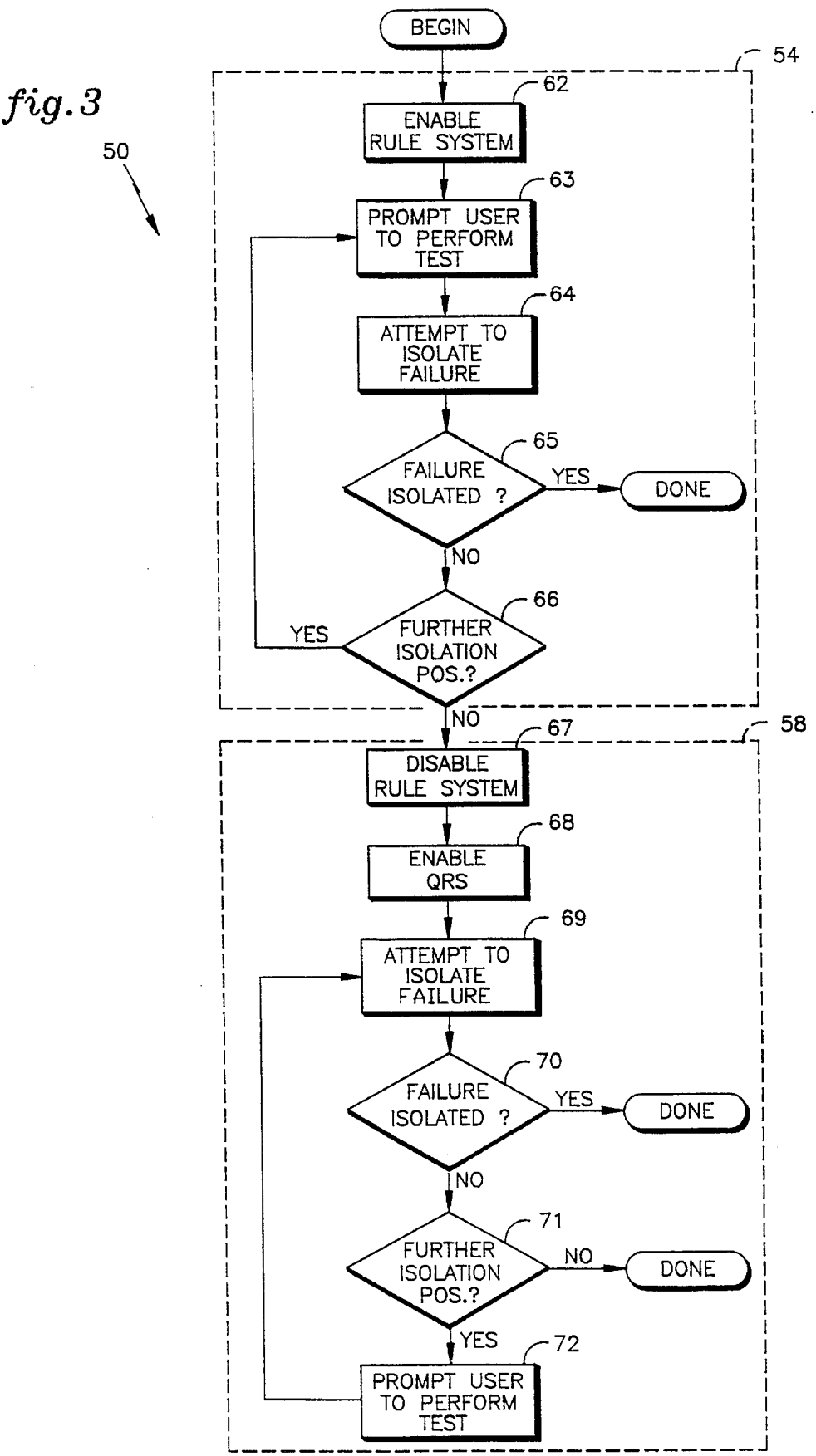
FIG. 3 is a flowchart which illustrates overall operation of failure isolation software.

FIG. 3, a flowchart 50 which illustrates operation of the failure isolation software, is separated into steps 54 for a rule based system and steps 58 for a QRS (Qualitative Reasoning System). The steps 54 for the rule based system, the implementation and operation of which is known to those skilled in the art (see for example *Building Expert Systems,* Frederick Hayes-Roth, Donald A. Waterman, and Douglas B. Lenat, editors. Addison-Wesley Publishing Company, Inc., Reading Mass. 1983), are executed first. The rule based system, which is programmed with information about common failures and the symptoms thereof, provides a rapid resolution to the determination of any failures that the system has been programmed to detect. However, for complex machines, anticipating every possible combination of failures and associated symptoms (and hence programming every combination of failures and symptoms into the rule based system) is, if not impossible, at least extremely impractical. Therefore, a particular failure may not be detectable by the rule based system. When this occurs, control passes from the steps 54 of the rule based system to the steps 58 of the QRS, which can isolate failures without being preprogrammed with all of the combinations of machine failures and symptoms. A QRS for machine failure isolation is disclosed in U.S. Pat. No. 5,138,694 to Hamilton, which is incorporated by reference herein.

Execution of the failure isolation software begins at an initial step 62, where the rule based system is enabled. At a second step 63, the user is prompted to perform a test. After the step 63, control passes to a step 64 where the rule based system attempts to isolate the failure by applying preprogrammed rules to the results of the test.

It is possible for a test to indicate a particular failure directly. For example, an observation that the voltage across the terminals of a battery is zero could directly isolate the failure to a dead battery (assuming the existence of a rule stating that if the voltage measured across the terminals of a battery is zero, then the battery is dead). Other tests may isolate the failure to a group of possible failures. For example, an observation that the voltage gage for the battery reads zero indicates that either the battery is dead, the gage is malfunctioning, or that the wire between the battery and the gage is broken (assuming again that an appropriate rule has been programmed into the system).

After the step 64, control passes to a step 65, where a test is made to determine whether the failure has been isolated. If the failure has been isolated to a single component, processing is complete. If the failure has not been isolated to a single component, control passes to a step 66, where a test is made to determine whether further failure isolation is possible. If further isolation is possible, control passes to the step 63, where the user is prompted to perform another test. The steps 63–66 form an iterative loop wherein the user is continuously prompted to perform more tests which the software uses to further isolate failures.

However, at the step 66 it may not be possible to further isolate the failure because of the inherent limitations of the rule based system (i.e., every possible combination of tests and related failures has not been programmed into the system). For example, suppose the observations are made that the voltage across the battery is twelve volts, the battery voltage gage reads zero, and the gage is not broken. If the rule based system is not programmed to take into account the possibility that a wire between the gage and the battery may be broken, then an impasse is reached. The test results do not correspond to any failures which were anticipated when the rule based system was programmed. When this occurs, control passes from the step 66 to a step 67 where the rule based system is disabled. The transition from the step 66 to the step 67 also corresponds to a transition from the steps 54 of the rule based system to the steps 58 of the QRS.

After the rule based system has been disabled at the step 67, control passes to a step 68 where the QRS is enabled. Following the step 68 is a step 69 where the QRS attempts to isolate the failure. QRS failure isolation is discussed in more detail hereinafter. Following the step 69 is a step 70 where a test is made to determine whether the failure has been isolated. If the failure has been isolated, processing is complete. Otherwise, control passes to a step 71 where a test is made to determine if further isolation is possible. If no further isolation by the QRS is possible, then processing is complete. Otherwise, control passes to the step 72 where the user is prompted to perform another test. Because the transition from the steps 54 of the rule based system to the steps 58 of the QRS are transparent to the user (i.e., the user is not informed that the transition has taken place) the prompt seen by the user at the step 72 is similar to the prompt that the user sees at the step 63. Control passes from the step 72 back to the step 69 where the QRS attempts again to isolate the machine failure.

Alternatively, it is possible to perform failure isolation using only the QRS. That is, the steps 54 of the rule-based system can be eliminated so that failure isolation is performed using only the steps 58 of the QRS by initiating processing at the step 68. Accordingly, the discussion of the QRS which follows can apply to either using QRS for failure isolation following use of a rule based system or to using only the QRS for failure isolation. Also, as described in more detail hereinafter, it is also possible to integrate portions of the rule based system with the QRS by prompting the user to perform component health assessment tests during failure isolation using the QRS.

Unlike rule based systems, the QRS does not directly correlate test results to specific failures. Instead, the QRS uses a computer model of the machine to iteratively generate hypotheses that hypothesize the failure of specific components and to derive, from user test results, predictions for the values of various machine parameters such as current flow, voltage, and fluid flow for each of the hypotheses. If at any time during the derivation process the predictions for a particular hypothesis are found to be inconsistent (either with themselves or with subsequent test results), the hypothesis is discarded.

The QRS depicts the machine using qualitative physics, a computer modeling technique wherein each component of the machine is represented as a black box having a plurality of terminals and a corresponding set of variables wherein each of the variables represents an attribute (e.g flow, pressure, temperature, etc) of a substance (e.g. current, fuel, etc.) that may enter or leave a terminal. Each of the variables can take on a finite set of qualitative values. The operation of a component is defined by confluences, a set of qualitative equations which define the relationships between variables of the component. For example, a pipe may be represented as having two terminals (each end of the pipe) and two variables (one representing the flow of fluid into the pipe and one representing the flow of fluid out of the pipe). A confluence which describes the operation of the pipe states that the variable which represents the flow out of the pipe has the same sign as the variable which represents the flow into the pipe. For more information about qualitative physics, a thorough discussion can be found in deKleer, Johan and Brown, John Seely, "The Origin, Form and Logic of Qualitative Physical Laws", Proceedings of the Eighth International Joint Conference on Artificial Intelligence, Karlsruhe, W. Germany, Aug. 1983.

It is also possible to define some of the variables and associated confluences both qualitatively and quantitatively. That is, portions of the machine being modeled can be described in terms of a first set of confluences using qualitative variables and by a second set of similar confluences using corresponding quantitative variables. For example, the voltage/speed relationship for a motor can be described qualitatively by stating that if the applied voltage is high, then the speed is fast and if the applied voltage is low then the speed is slow. Qualitative variables representing voltage and speed would take on qualitative values of HIGH/LOW and FAST/SLOW, respectively. The same motor can also be described quantitatively using quantitative variables (i.e., variables that can equal any numeric value) along with the equations that describe the relationship between the quantitative voltage and speed variables. Note also that it is possible to use the same confluence to describe both a qualitative and a quantitative relationship between the variables (e.g., the voltage across a resistor is the product of the resistance and the current). Integrating qualitative and quantitative variables and confluences is described in more detail hereinafter.

The various components of the machine are grouped hierarchically. A compound component is composed of a plurality of subcomponents while an elementary component is a component having no substructure. For example, a power supply may be represented as a single component at one level of the hierarchy, but may in fact be composed of a number of components (e.g. capacitors, transformer, etc.) at another, lower, level of the hierarchy. At the highest level of the hierarchy, the entire machine is represented as a single compound component. At the lowest level of the hierarchy are all of the elementary components which comprise the machine.

It is possible to modify the model hierarchy in a manner that optimizes the fault isolation process. That is, it is possible to rearrange the hierarchy of the model such that expansion of a compound component at one level of the hierarchy does not necessarily result in subcomponents that physically exist or are physically part of the compound component. A subcomponent can be "reparented" by being moved from one compound component to another. A group of components can be regrouped into a pseudo-component that can be placed as a component of an existing compound model in the hierarchy. Components that are part of the same functional path (i.e., are interconnected and work together to perform the same function) can be automatically regrouped. It is also possible to regroup components that are related in other ways including, but not limited to, spatial proximity, functional similarity, and reliability. Modifying the model hierarchy is discussed in more detail hereinafter.

Since the components are modeled as black boxes, it may be useful to examine a component at a lower level of the hierarchy in order to further isolate a failure (i.e., to get inside the black box in order to obtain more information). For example, after determining that a power supply has failed, the QRS may expand the power supply component into subcomponents and continue the failure isolation process at that level of the hierarchy.

The relationships defined by the various confluences of a particular component are called "constraints". The QRS computes the effects of the failure of a particular component by suspending (i.e., removing) the constraints of that component. For example, for a machine having three components, X, Y, and Z, the QRS would test a hypothesis that component X has failed by creating a qualitative physics model of the machine with the constraints of the confluences of component X suspended (i.e., a model of the machine which contains only the confluences for components Y and Z, which are assumed not to have failed). The QRS then generates a set of predictions (predicted values of variables) using the confluences and the results of tests performed by the user. If the resulting predictions are consistent, X remains as a valid hypothesis. Otherwise, X is eliminated as a hypothesis. A hypothesis can also be eliminated if a variable value associated with a subsequent test is found to be inconsistent with a prediction. A thorough discussion of constraint suspension can be found in Davis, Randall "Diagnostic Reasoning Based on Structure and Behavior", *Artificial Intelligence*, 24 (1984), 347–410.

The QRS begins with an initial hypothesis that no components of the machine have failed. If the predictions generated from that hypothesis are consistent, then the QRS software concludes that there are no failures and the failure isolation process is terminated. Otherwise, the QRS software generates a plurality of hypotheses, each corresponding to the failure of a single component of the machine. The predictions associated with each of these hypotheses are generated and then tested for consistency. If all of the predictions associated with the single component hypotheses are inconsistent (thus disproving all of the hypotheses), the QRS software generates a new set of hypotheses corresponding to the simultaneous failure of two machine components. If all of the dual component predictions are found to be inconsistent, the QRS software generates a new set of hypotheses, each corresponding to three simultaneous failures, and so on.

For example, for a machine having three components A, B, and C, the QRS would initially generate a set of confluences based on the hypothesis that no components have failed (i.e., would maintain all of the confluences for all of the components), determine predictions for the hypothesis, and test the consistency of the predictions associated therewith. If the predictions which are based on the hypothesis tester are consistent, then the hypothesis that no components have failed has been verified and the failure isolation process is terminated. Otherwise, the QRS generates three new hypotheses: a hypothesis that only component A has failed, a hypothesis that only component B has failed, and a hypothesis that only component C has failed. The QRS then generates three sets of predictions: predictions for hypothesis A, predictions for hypothesis B, and predictions for hypothesis C. The predictions for hypothesis A are the predicted values that the variables (i.e., machine parameters, such as current flow, fluid flow, voltage, etc) would equal if hypothesis A were true. Similarly, the predictions associated with hypothesis B are the predicted values that the variables would equal if hypothesis B were true and the predictions associated with hypothesis C are the predicted values that the variables would equal if hypothesis C were true. If the predictions associated with hypothesis A are inconsistent, then the hypothesis that A has failed is inconsistent and hypothesis A is eliminated from the list of valid hypotheses. If the predictions associated with B and C are consistent, then further failure isolation, to determine whether component B or component C has failed, may be required.

For the above example, it is possible for the QRS to be able to eliminate hypotheses A, B, and C, thereby leading to the conclusion that more than one component of the machine has failed simultaneously. The QRS would then create three new hypotheses: hypothesis AB, which assumes components A and B have simultaneously failed, hypothesis AC which assumes components A and C have simultaneously failed, and hypothesis BC, which assumes components B and C have simultaneously failed. The QRS then begins failure isolation using these hypotheses. For complex machines, increasing the number of failed components per hypothesis increases the processing demands on the computer. When the QRS has eliminated all of the N component hypotheses, the user is asked whether the QRS software should proceed to begin generating and testing N+1 component hypotheses or terminate failure isolation altogether. The user may prefer not to wait for the QRS to generate and test the new set of hypotheses.

Figure 4:
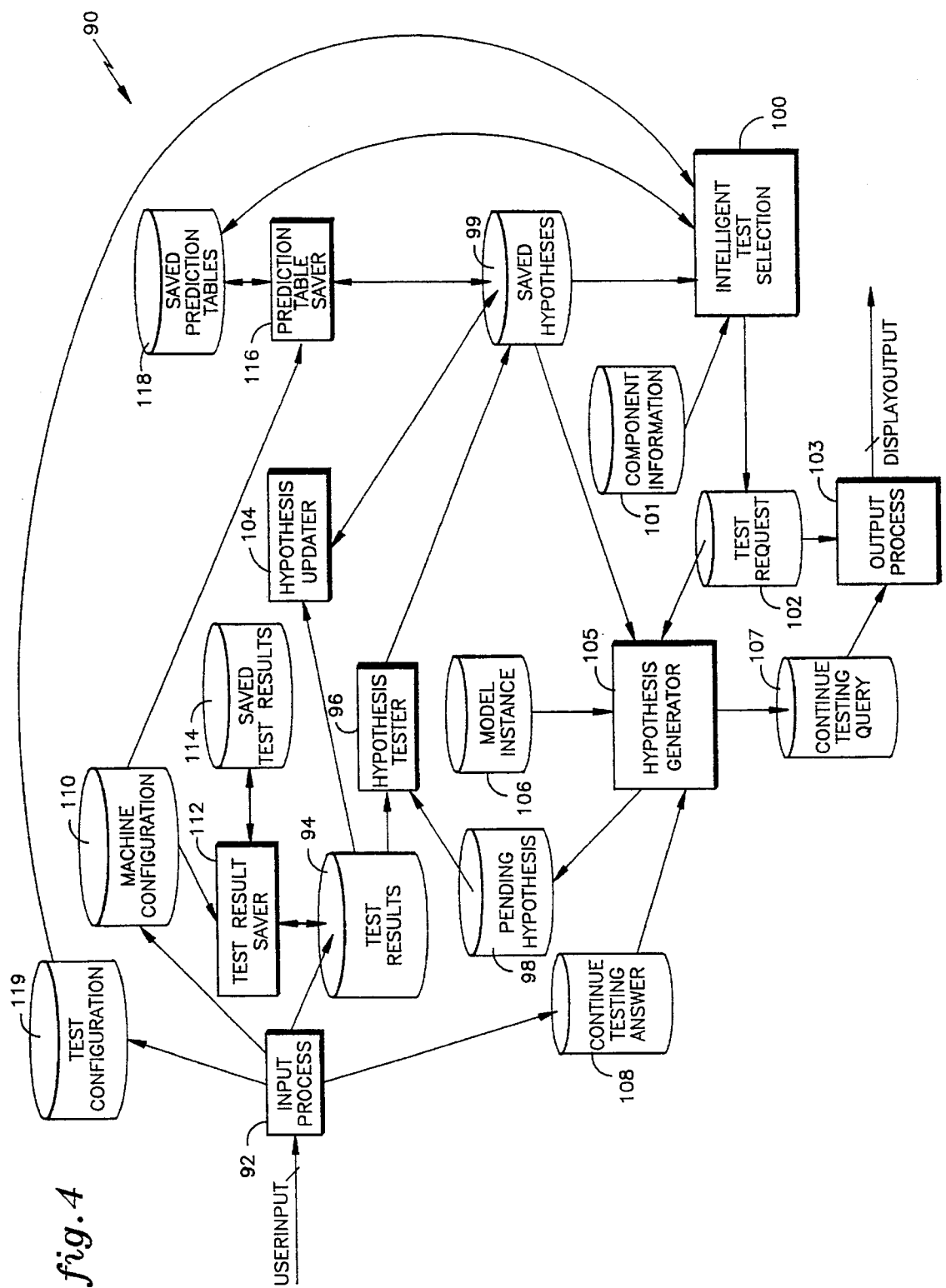
FIG. 4 is a dataflow diagram which illustrates operation of Qualitative Reasoning System software.

FIG. 4 is a dataflow diagram 90 which illustrates operation of the QRS. Boxes on the diagram 90 indicate program modules (i.e., portions of the QRS software) while cylinders indicate data elements (i.e., portions of QRS data). Arrows between boxes and cylinders indicate the direction of the flow of data. Unlike a flowchart, no portion of the dataflow diagram 90 indicates any temporal relationships between the various modules.

Test results supplied by the user are provided to the QRS software by an input signal USERINPUT, which is indicated on the diagram 90. The USERINPUT signal is processed by an input process code module 92, which converts keystrokes entered by the user into a format that can be processed by the QRS software. The output of the input process module 92 is stored in a test results data element 94, which contains results of tests performed by the user during the failure isolation process. If the rule based system is used for failure isolation prior to using the QRS, the test results data element 94 can be initialized with data indicative of the results of tests performed by the user during the rule based system phase of the failure isolation process.

A hypothesis tester code module 96 uses the test results data element 94 and a pending hypothesis data element 98 to generate potentially valid hypotheses and predictions for each of the hypotheses. The pending hypothesis data element 98 contains a hypothesis to be tested. The hypothesis tester 96 tests the hypothesis by propagating the variable values associated with test results through the confluences of the hypothesis to generate predictions which must be true for the hypothesis to be true. During the process of generating predictions, the hypothesis tester 96 may find an inconsistency. For example, one subset of confluences may predict a positive voltage between two particular points while a different subset of confluences may predict a negative voltage between the same two points. When this occurs, the hypothesis being tested has been disproved and is discarded by the hypothesis tester 96. A hypothesis from the pending hypothesis data element 98 which cannot be disproved by the hypothesis tester 96, and the predictions associated therewith, are output to a saved hypotheses data element 99.

For example, suppose the pending hypothesis data element 98 contains hypothesis A. The hypothesis tester 96 tests the validity of hypothesis A by examining a model of the machine having the constraints of component A suspended (i.e., a model containing all component confluences except the confluences which describe the operation of component A) and then predicting the values of variables. If during the course of generating predictions for hypothesis A, the hypothesis tester 96 finds an inconsistency, then hypothesis A has been disproved. Otherwise, hypothesis A and the predictions associated with hypothesis A are output to the saved hypotheses data element 99.

If the saved hypotheses data element 99 contains more than one hypothesis, it may be useful for the user to perform additional tests in order to provide information to eliminate some of the hypotheses. An intelligent test selection code module 100 is provided with input from the saved hypotheses data element 99 and a component information data element 101. The component information data element 101 contains empirical data such as specific test procedure information and component failure rates for each component. The intelligent test selection 100 uses hypothesis predictions and information from the component information data element 101 to determine the best test for the user to perform (i.e., the test which maximizes the degree of failure isolation while simultaneously minimizing the cost to the user of performing the test). The intelligent test selection 100 outputs the best test information to a test request data element 102. An output process code module 103, which is provided with data from the test request data element 102, transforms the test request 102 into a human readable format and provides a signal, DISPLAYOUT, which causes a user prompt, indicating the next test for the user to perform, to be placed on the display 32 of the PMA 30.

A test result supplied by a user may rule out one or more hypotheses stored in the saved hypotheses data element 99. A hypothesis updater 104 examines hypotheses and associated predictions stored in the saved hypotheses data element 99 and compares the predictions for each hypothesis to variable values associated with the test results 94 entered by the user. The hypothesis updater 104 eliminates hypotheses having contrary predictions. The hypothesis updater 104 also eliminates hypotheses corresponding to failed components that have been empirically determined to be working properly on the basis of component health assessments performed by the user and provided to the test results data element 94. For example, suppose the saved hypotheses data element 99 contains hypothesis A, hypothesis B, and hypothesis C and that hypothesis A predicts a positive value for a particular voltage, hypothesis B predicts a negative value for the same voltage and hypothesis C makes ambiguous predictions about the value of the voltage (i.e., hypothesis C predicts either a negative or positive value for the voltage). Further assume that the intelligent test selection 100 chooses the voltage measurement to be the best test and, after being prompted, the user enters the voltage as positive. The hypothesis updater 104 can eliminate hypothesis B from the saved hypotheses data element 99 because the prediction for hypothesis B that the voltage is negative is incorrect, thereby disproving hypothesis B. Hypothesis A correctly predicts that the voltage is positive, so hypothesis A remains in the saved hypotheses data element 99. The hypothesis updater 104 cannot eliminate hypothesis C because hypothesis C predicts either positive or negative voltage.

It is possible for the intelligent test selection 100 to not be able to generate any tests for the user to perform which would eliminate any of the hypotheses stored in the saved hypotheses data element 99. When this occurs, a hypothesis generator 105, upon detecting that the test request data element 102 is empty, attempts to generate more hypotheses by expanding one or more of the components associated with hypotheses within the saved hypotheses data element 99 into subcomponents, and generating hypotheses based on those subcomponents. The hypothesis generator 105 uses a model instance data element 106, which contains qualitative physics descriptions of the components and information regarding the hierarchical ordering of the components. A description of the construction and contents of the model instance 106 is provided in more detail hereinafter. Information from the model instance data element 106 can be used to initialize the component information data element 101. The output of the hypothesis generator 105 is provided to the pending hypothesis data element 98.

For example, suppose that the saved hypotheses data element 99 contains a first hypothesis corresponding to failure of the machine power supply and a second hypothesis corresponding to failure of the machine fuel system. Further suppose that the intelligent test selection 100 is unable to provide the user with a test to perform to distinguish between the two, causing the test request data element 102 to be empty. The hypothesis generator 105 detects that the test request data element 102 is empty and expands the power supply into subcomponents (i.e., capacitors, transformer, etc.) and also expands the fuel system into the subcomponents thereof. A new set of hypotheses based on the subcomponents is created. The new set of hypotheses, which the hypothesis generator 105 will provide to the pending hypothesis data element 98 (one at a time), is tested by the hypothesis tester 96 and the iterative process of prompting the user for tests and eliminating hypotheses continues. Note that the failure isolation process is complete when the saved hypotheses data element 99 contains only one hypothesis which assumes the failure of one or more elementary components or when there are no more cost effective tests that can be performed.

It is also possible for the hypothesis tester 96 to eliminate all of the hypotheses stored in the pending hypothesis data element 98, thereby causing the saved hypotheses data element 99 to be empty. This occurs when the number of failed components per hypothesis is greater than had been assumed. Eliminating all of the hypotheses corresponding to N simultaneously failed components indicates that more than N machine components have failed. For example, if all of the hypotheses corresponding to a single component failure are eliminated by the hypothesis tester 96 and/or the hypothesis updater 104, then it logically follows that more than one component has simultaneously failed. (Note that the possibility that no components have failed is tested initially).

When an entire set of hypotheses corresponding to N component failures have been disproved by the hypothesis tester 96, the hypothesis generator 105 asks the user for permission to generate a new set of hypotheses corresponding to N+1 component failures by writing user prompt information to a continue testing query data element 107. The continue testing query data element 107 is provided as an input to the output process module 103, which transforms the query 107 into a human readable format for output to the display 32. The user's answer to the question is provided by the USERINPUT signal, processed by the input process 92 and stored in a continue testing answer data element 108. If the user chooses not to continue testing, failure isolation is terminated. Otherwise, the continue testing answer data element 108, which is provided as an input to the hypothesis generator 105, causes the hypothesis generator 105 to produce a new set of hypotheses (using information from the model instance data element 106), which correspond to increasing the number of simultaneously failed components by one.

The hypothesis generator 105 may also provide the pending hypothesis data element 98 with hypotheses from the saved hypotheses data element 99. The hypothesis generator 105 uses input provided by the test request data element 102 to determine if the saved hypotheses data element 99 contains hypotheses which make ambiguous predictions for a variable associated with a result of a test which the user is requested currently to perform. Hypotheses which make ambiguous predictions for the most recently acquired variable value are passed from the saved hypotheses data element 99 to the pending hypothesis data element 98 in order to be retested by the hypothesis tester 96. Some of the hypotheses which are retested may be invalidated using the new variable values.

In certain instances, a machine being tested will have more than one operational configuration. During fault isolation, a user may be prompted to modify machine control inputs in a manner that causes the machine operational configuration to change. The user could also be prompted to perform "invasive tests" which intentionally alter operation of one or more components of the machine by removing a component or by placing jumpers across a component. Many of the test results obtained while the machine is in one configuration are invalid for analyzing the machine while the machine is in another configuration. For example, a machine can have a primary power mode and a backup power mode. A voltage measurement on the primary power lines while the machine is in the primary power mode may not be valid for failure isolation after the machine switches to the backup power mode.

Fault isolation can be performed on a machine having multiple configurations by maintaining separate sets of test results and hypothesis predictions wherein each unique set of test results and predictions corresponds to a unique machine configuration. When a test is performed that causes the machine to change configurations, the current test results and predictions are saved and a different set is substituted therefor and used to continue the failure isolation process.

A machine configuration data element 110 is connected to and receives input from the input process code module 92. Under certain conditions, described in more detail hereinafter, the user is prompted to either observe and enter the configuration of the machine or is prompted to modify control inputs to the machine and then confirm the modification. In either case, the input process code module 92 determines the specific configuration of the machine (e.g., backup power mode, primary power mode) and provides data to the machine configuration data element 110 indicative of the particular machine configuration. For a machine that can be operated in multiple configurations, the user may be prompted to enter the initial configuration at the beginning of the fault isolation process.

Data from the machine configuration data element 110 is provided to a test result saver code module 112. The test result saver 112 detects a change in machine configuration (i.e., when the present machine configuration is different from the machine configuration for the last iteration). A change in the machine configuration causes the test result saver 112 to transfer data from the test results data element 94 to a saved test results data element 114. The saved test results data element 114 contains sets of test results that were obtained when the machine was operating in different configurations.

The test result saver 112 also replaces data stored in the test results data element 94 with data from the saved test results data element 114 that corresponds to the current machine configuration. That is, when the machine configuration changes, any test results stored in the saved test results data element 114 that were obtained during fault isolation when the machine was in the current configuration are transferred to the test results data element 96. If there is no test result data corresponding to the present machine configuration, then the test results saver 112 initializes the data in the test results data element 94 to indicate that no test results have yet been obtained, except for any control inputs that caused the configuration transition.

For example, suppose fault isolation begins when the machine is in configuration A. A set of test results is obtained and then the user is prompted to perform a test that transitions the machine into configuration B. The test result saver 112 then stores the data from the test results data element 94 into the saved test results data element 114 and initializes the data in the test results data element 94 to indicate that no test results have yet been obtained while the machine is in configuration B, except, as noted above, test results relating to the control inputs that caused the configuration change (e.g., a switch that switches the machine from a primary power mode to backup power mode). If after a few iterations the user is prompted to perform a test that transitions the machine from configuration B back to configuration A, then the test result saver 112 will transfer the configuration B set of test results from the test results data element 94 to the saved test results data element 114 and will restore the set of test results corresponding to configuration A from the saved test results data element 114 to the actual test results data element 94.

Data from the machine configuration data element 110 is also provided to a prediction table saver 116. In response to a machine configuration change, the prediction table saver 116 transfers hypothesis prediction tables (discussed in more detail hereinafter) associated with each hypothesis in the saved hypotheses data element 99 to a saved prediction tables data element 118. The saved prediction tables data element 118 is analogous to the saved test results data element 114 and contains sets of predictions for the hypotheses stored in the saved hypotheses data element 99 that correspond to different machine configurations. Prior to selecting the first test, the saved prediction tables data element 118 is initialized with sets of prediction tables for each of the hypotheses for all of the possible configurations that a test could cause the machine to enter. After transferring prediction tables from the saved hypotheses data element 99, the prediction table saver 116 restores prediction tables from the saved prediction tables data element 118 to the prediction tables in the saved hypotheses data element 99.

It is possible to optimize the fault isolation process by keeping track of the previous test steps performed by the user. For example, if an access panel was removed by the user in order to perform a test, then it will be less time consuming to perform a second test that requires removing the same access panel since the panel is already off the machine. A test configuration data element 119 is provided with data from the input process code module 92. The test configuration data element 119 contains data indicative of the current test configuration of the machine (e.g. panels and components which have been removed during testing, the placing of jumpers, tools already accessed by the user, etc.).

Data from the test configuration data element 119 is provided to the intelligent test selection code module 100. The intelligent test selection code module 100 uses the information to select the optimal test for the user to perform based in part on the current test configuration of the machine. Operation of the intelligent test selection code module 100 in conjunction with the machine test configuration data element 119 is described in more detail hereinafter.

Figure 5A:
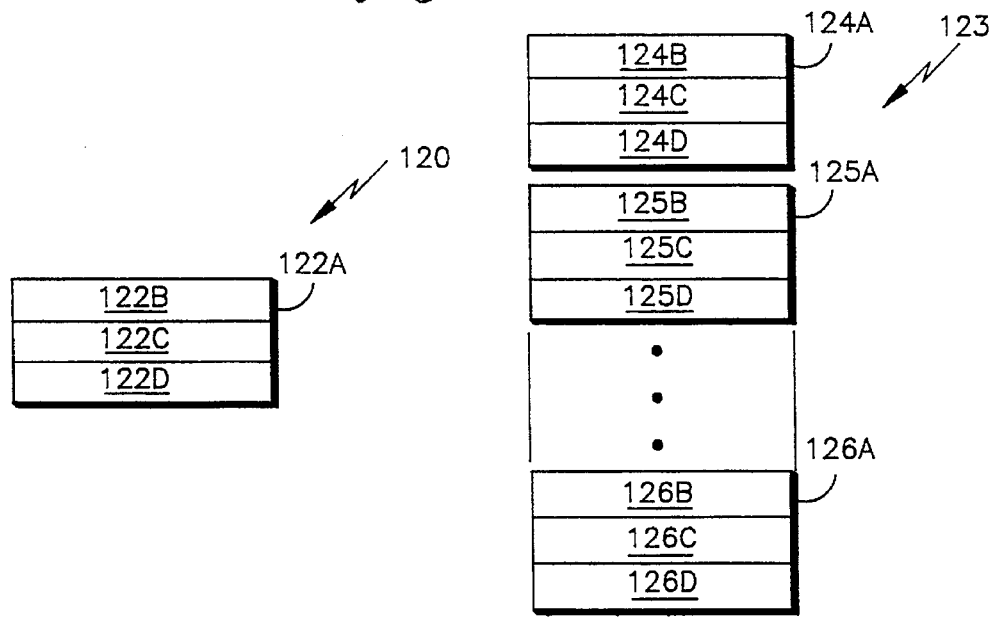
FIG. 5A illustrates data structures used by the Qualitative Reasoning System software.

FIG. 5A illustrates data structures used by the QRS software. A pending hypothesis data structure 120, which represents data stored in the pending hypothesis data element 98, contains a pending hypothesis 122A which comprises a hypothesis identification element 122B, a prediction table 122C, and a cached confluences table 122D. The hypothesis identification element 122B contains information to identify the particular pending hypothesis. For example, the hypothesis identification element 122B may identify the pending hypothesis 122A as a hypothesis which assumes a failed power supply.

The prediction table 122C contains all of the variables (i.e., machine parameters) associated with the pending hypothesis 122A. The prediction table 122C is constructed by the hypothesis generator 105, which determines all of the variables of a hypothesis when the hypothesis is created. Initially, the prediction table 122C contains very few, if any, values for the variables. Each time a hypothesis is tested, however, the hypothesis tester 96 predicts more values for the variables of the prediction table 122C as more test results become available.

The cached confluences table 122D contains all of the model confluences for the pending hypothesis 122A. The cached confluences table 122D can be indexed by each of the variables from the prediction table 122C. The elements of the cached confluences table 122D contain all of the model confluences in which the index variable appears, thereby providing the hypothesis tester 96 with a means for rapidly accessing confluences associated with a hypothesis.

In some instances, it is possible for variables and associated confluences to express both qualitative and quantitative information. Therefore, some of the cached confluences in the cached confluences table 122D can be used both qualitatively and quantitatively to describe operation of components of the machine. Operations are performed either qualitatively or quantitatively, depending upon whether the values of input variables to the confluences are qualitative or quantitative. For example, a confluence that describes operation of a resister could state that the voltage is the product of the resistance and the current. If the current and the resistance are given as quantitative values (e.g., three amps and five ohms), then the voltage is calculated quantitatively to equal fifteen volts. If, on the other hand, the current and resistance are only given as qualitative values (e.g., both "plus"), then the voltage is calculated qualitatively to equal "plus". Also, if the resistance were given as greater than one ohm and the current were given as greater than five amps, then the voltage is calculated using mixed qualitative/quantitative arithmetic to be greater than five volts. Propagation of both qualitative and quantitative values through the confluences is discussed in more detail hereinafter.

A saved hypotheses data structure 123, which represents data stored in the saved hypotheses data element 99, contains a first current hypothesis 124A, a second current hypothesis 125A, and an Nth current hypothesis 126A. The first current hypothesis 124A contains a hypothesis identification element 124B, a prediction table 124C, and a cached confluences table 124D. Similarly, the second current hypothesis 125A contains a hypothesis identification element 125B, a prediction table 125C, and a cached confluences table 125D and the Nth current hypothesis 126A contains a hypothesis identification element 126B, a prediction table 126C, and a cached confluences table 126D. The hypothesis identification elements 124B, 125B, 126B contain information to identify the particular saved hypotheses and are similar to the hypothesis identification element 122B of the pending hypothesis 122A. The prediction tables 124C, 125C, 126C are similar to the prediction table 122C from the pending hypothesis 122A except that the hypothesis tester 96 may have provided values for some of the variables. The cached confluences tables 124D, 125D, 126D are similar to the cached confluences table 122D from the pending hypothesis 122A.

Figure 5B:
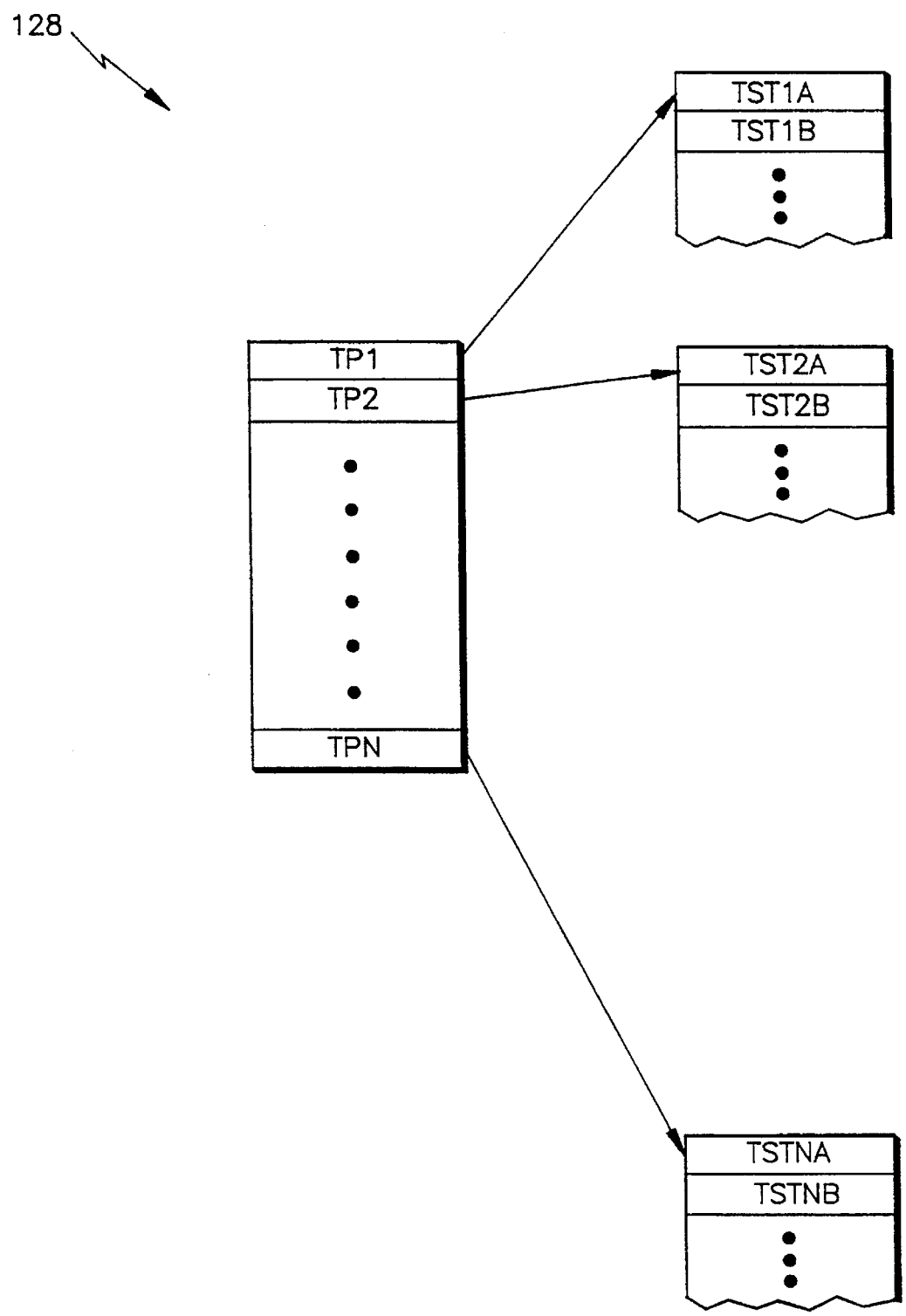
FIG. 5B illustrates data structures used by the Qualitative Reasoning System software for providing test procedures.

FIG. 5B is a diagram 128 that illustrates test procedure data structures associated with variables of the prediction table 122C. As described in more detail hereinafter, construction of the model instance data element 106 can include individually specifying one or more test procedures for the variables and/or components of the model. In some instances, it may not be possible for a user to measure or test a particular variable (e.g., the frictional force experienced by an internal mechanical part). In that case, there will be no test procedure for that particular variable.

Test procedures are shown in the diagram 128 as a list including TP1, TP2, . . . TPN. Each of the test procedures contains data indicating how the associated variable or component may be tested by a user. For example, if the variable V1 represents the flow of current through a resistor, an associated test procedure may prompt the user to measure the current. As is described in more detail hereinafter, a test procedure could also include a component health assessment (e.g. a visual determination as to whether the resistor is burnt out).

Associated with each test procedure is a plurality of test steps. For example, the diagram 128 shows the test procedure TP1 as being linked to test steps TS1A, TS1B, etc. Each of the test steps represents a single action for the user to perform in the process of executing the associated test procedure. For example, a test step could provide instructions to the user to remove an access panel, observe a flow, etc. The text for prompting the user to take the appropriate action is stored with each test step. Test steps can also have associated therewith a cost (e.g., amount of time). Using the cost of each test step to determine the optimal test for the user to perform is discussed in more detail hereinafter.

Test procedure data can include data indicative of one or more presteps which must be carried out before the test can be performed. For example, prior to performing a test relating to the backup power supply, it may be necessary to place the machine in a configuration where the primary power supply is disabled and all power is being provided by the backup power supply. Presteps direct a user to perform the appropriate steps to set up the associated test. Test procedures can also include poststeps which are performed after the test procedure.

Figure 6:
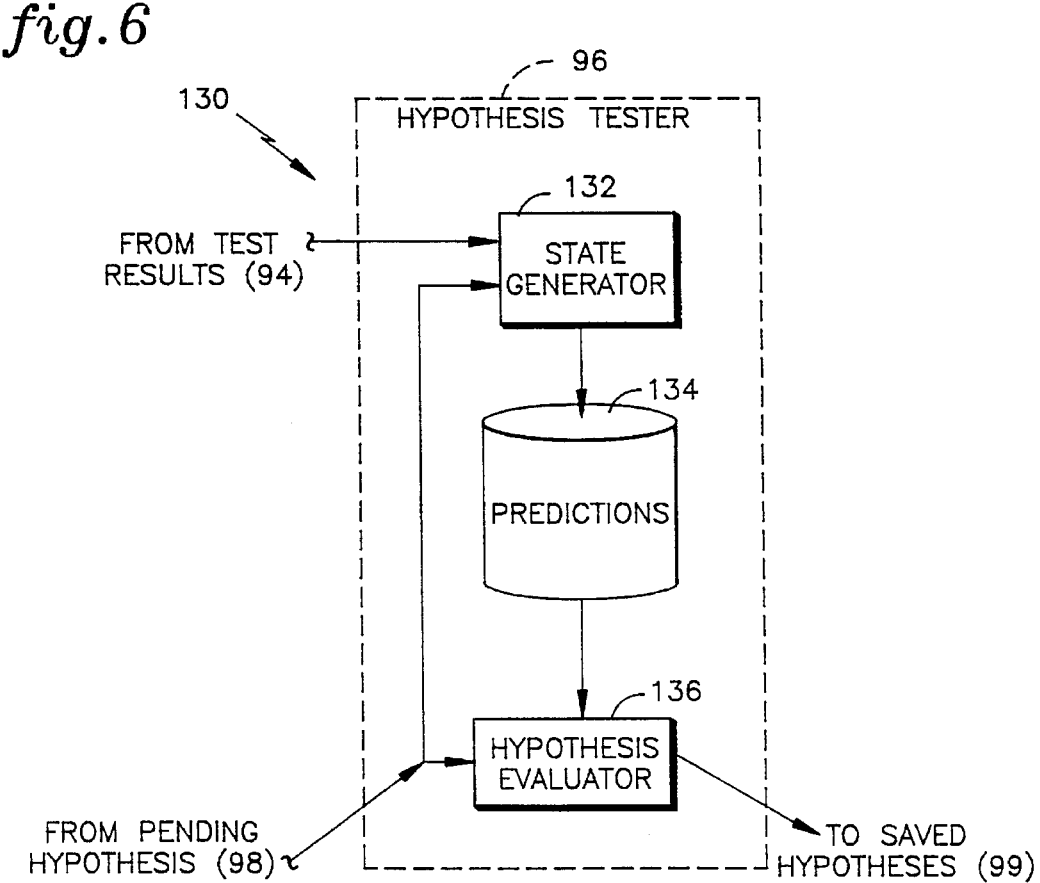
FIG. 6 is a dataflow diagram illustrating operation of a hypothesis tester within the Qualitative Reasoning System software.

FIG. 6 is a dataflow diagram 130 illustrating operation of the hypothesis tester 96. A state generator 132 is provided with input from the test results data element 94 and from the pending hypothesis data element 98. The state generator 132 processes the test results 94 and the pending hypothesis 98 to produce a predictions data element 134 which contains the prediction table for the particular hypothesis that is being tested. The state generator 132 produces the predictions data element 134 by filling in the prediction table (from the pending hypothesis data element 98) with values for some of the variables. The values of variables are determined by processing the test results 94 and the cached confluences from the pending hypothesis data element 98. If the state generator 132 detects an inconsistency while attempting to predict values for the predictions data element 134, a null table, instead of the prediction table, is stored in the predictions data element 134. Actual calculation of the values is performed by manipulating the Common Lisp expressions which represent the model confluences. The manipulation of Common Lisp expressions is known to those skilled in the art.

A hypothesis evaluator 136 is provided with data from the predictions data element 134 and the hypothesis from the pending hypothesis data element 98. For each hypothesis, the hypothesis evaluator 136 determines if the predictions data element 134 contains a null table. If not, the hypothesis evaluator 136 passes both the hypothesis (from the pending hypothesis data element 98) and the associated prediction table (from the predictions data element 134) on to the saved hypotheses data element 99. Otherwise, the hypothesis being tested has been invalidated and is not passed on.

Note that, as discussed above, it is possible for some of the confluence variables to represent quantitative as well as qualitative values. For instance, a variable V1 that represents current through a wire can be represented qualitatively as having the value space {−∞, −max, −min, zero, min, max, +∞}. The same variable, V1, can also represent a quantitative value, such as a real number that ranges from minus infinity to plus infinity. A quantitative value can be assigned to V1 if either the user directly measures V1 and enters a quantitative value therefor, or if the user quantitatively measures and enters another variable which is used to calculate a value for V1. For example, if a particular confluence indicates that V1 equals two times a variable V2, and V2 is quantitatively measured and entered, then a quantitative value can be assigned to V1.

A value correspondence is an association of a numeric value with a qualitative landmark value. The qualitative value space of a variable can be mapped to a set of quantitative values. For example, for the variable V1, discussed above, having a qualitative value space of {−∞, −max, −min, zero, min, max, +∞}, a corresponding set of quantitative values could be {−∞, −50, −10, 0, 10, 50, +∞}, indicating that the qualitative value of −max for V1 corresponds to a quantitative value of −50, the qualitative value of −min for V1 corresponds to a quantitative value of −10, the qualitative value of zero for V1 corresponds to a quantitative value of 0, the qualitative value of min for V1 corresponds to a quantitative value of 10, and the qualitative value of max for V1 corresponds to a quantitative value of 50.

Using the landmark relationships discussed above allows mapping of qualitative values into quantitative values and mapping of quantitative values into qualitative values. For example, if the variable V1, discussed above, is assigned a quantitative value of 15, then given the landmark relationships discussed above, it is possible to also assign the qualitative value (min max) (i.e., the open interval from min to max) to V1, since min is defined as being equal to 10 and max is defined as being equal to 50.

Furthermore, value correspondences allow qualitative values to be compared in instances where, without value correspondences, the comparison would be indeterminate. For example, assume the qualitative variable V1, discussed above, is to be compared with a second qualitative variable V2 having a qualitative value space of {−∞, −gigantic, −large, −small, zero, small, large, gigantic, +∞}. If V1 equals min and V2 equals small, then V1 and V2 cannot be compared without knowing the underlying quantitative values that define the qualitative value spaces for V1 and V2. However, if the value space of V2 has a corresponding set of quantitative values of {−∞, −100, −20, −5, 0, 5, 20, 100, +∞}, then V1 is greater than V2 when V1 equals min and V2 equals small. If, on the other hand, the value space of V2 has a corresponding set of quantitative values of {−∞, −100, −60, −30, 0, 30, 60, 100, +∞}, then V1 is less than V2 when V1 equals min and V2 equals small.

In order to perform the operation illustrated above, a global landmark ordering is employed. A global landmark ordering can be used for fast, efficient determination of the relationship between two landmarks during qualitative reasoning. This provides a fast integrated qualitative/quantitative reasoning system since all variable restrictions are based upon at least one relational operator (e.g., =, <, >).

A global landmark ordering has three parts: a landmark-landmark array, a landmark-greater-than vector, and a landmark-less-than vector. The landmark-landmark array describes the relationships between symbolic landmarks wherein a direct index into the array discerns whether one landmark is greater than another. The landmark-greater-than and landmark-less-than vectors describe relationships between landmarks and numeric values. Using a landmark to index into the landmark-greater-than vector returns the largest numeric value that the landmark is guaranteed to be greater than (i.e., the greatest numeric lower bound). Conversely, using a landmark to index into the landmark-less-than vector returns the smallest numeric value that the landmark is guaranteed to be less than (i.e., the least numeric upper bound).

For example, consider the variables X and Y, whose value spaces are {−∞, −critical, −max, −ok, zero, ok, max, critical, +∞} and {−∞, −max, −min, zero, min, max, +∞}, respectively. From these value spaces, a partial ordering for the symbolic landmarks may be derived, since the landmarks for X and Y partially overlap. Thus, for example, the symbolic landmark min is known to be less than the symbolic landmark critical, since min is less than max in the value space of variable Y, and max is less than critical in the value space of variable X. However, the relationship between ok and min is indeterminate. The landmark-landmark array stores the relationships between each symbolic landmark. This defines the global partial ordering of the landmarks in a model, and makes rapid retrieval possible. Thus, in the example above, accessing the landmark-landmark array with min and critical returns "<" (i.e., less-than), since min is less than critical, while accessing the landmark-landmark array with ok and min returns "?" (i.e., indeterminate), since the relationship between ok and min is indeterminate.

Continuing the example, suppose that the quantitative value for max has been defined to be 100. This information is stored in the landmark-greater-than and landmark-less-than vectors. These vectors allow the numeric bounds of symbolic landmarks to be rapidly retrieved. The landmark-greater-than and landmark-less-than vectors would contain the following values:

landmark-less-than vector:

| Qual. Value | Quant. Value |
| --- | --- |
| −∞ | |
| −critical | −100 |
| −max | |
| −ok | 0 |
| −min | 0 |
| zero | |
| ok | 100 |
| min | 100 |
| max | |
| critical | +∞ |
| +∞ | | landmark-greater-than vector:

| Qual. Value | Quant. Value |
| --- | --- |
| −∞ | |
| −critical | −∞ |
| −max | |
| −ok | −100 |
| −min | −100 |

| Qual. Value | Quant. Value |
|---|---|
| zero | |
| ok | 0 |
| min | 0 |
| max | |
| critical | 100 |
| $+\infty$ | |

Thus, for example, consulting the landmark-greater-than and landmark-less-than vectors for the symbolic landmark ok would determine that ok was greater than 0 and less than 100. Note that the landmark-greater-than and landmark-less-than vectors are not accessed for landmarks that have quantitative values directly associated therewith (e.g., zero, max, $-\infty$, $+\infty$). Note also that $-\infty$ and $+\infty$ are treated both as symbolic landmarks and as quantitative values.

The state generator 132 propagates values of variables through confluences. Since qualitative values can be integrated with quantitative values for both variables and confluences, the detailed discussion of the state generator 132 which follows relates to propagation of integrated qualitative and quantitative values. Note that, as discussed above, it is possible to map quantitative values for variables into qualitative values for variables. Any variable having a quantitative value will have a corresponding qualitative value so that any operations which require a qualitative value can be performed on a variable that is set to a quantitative value.

Figure 7:
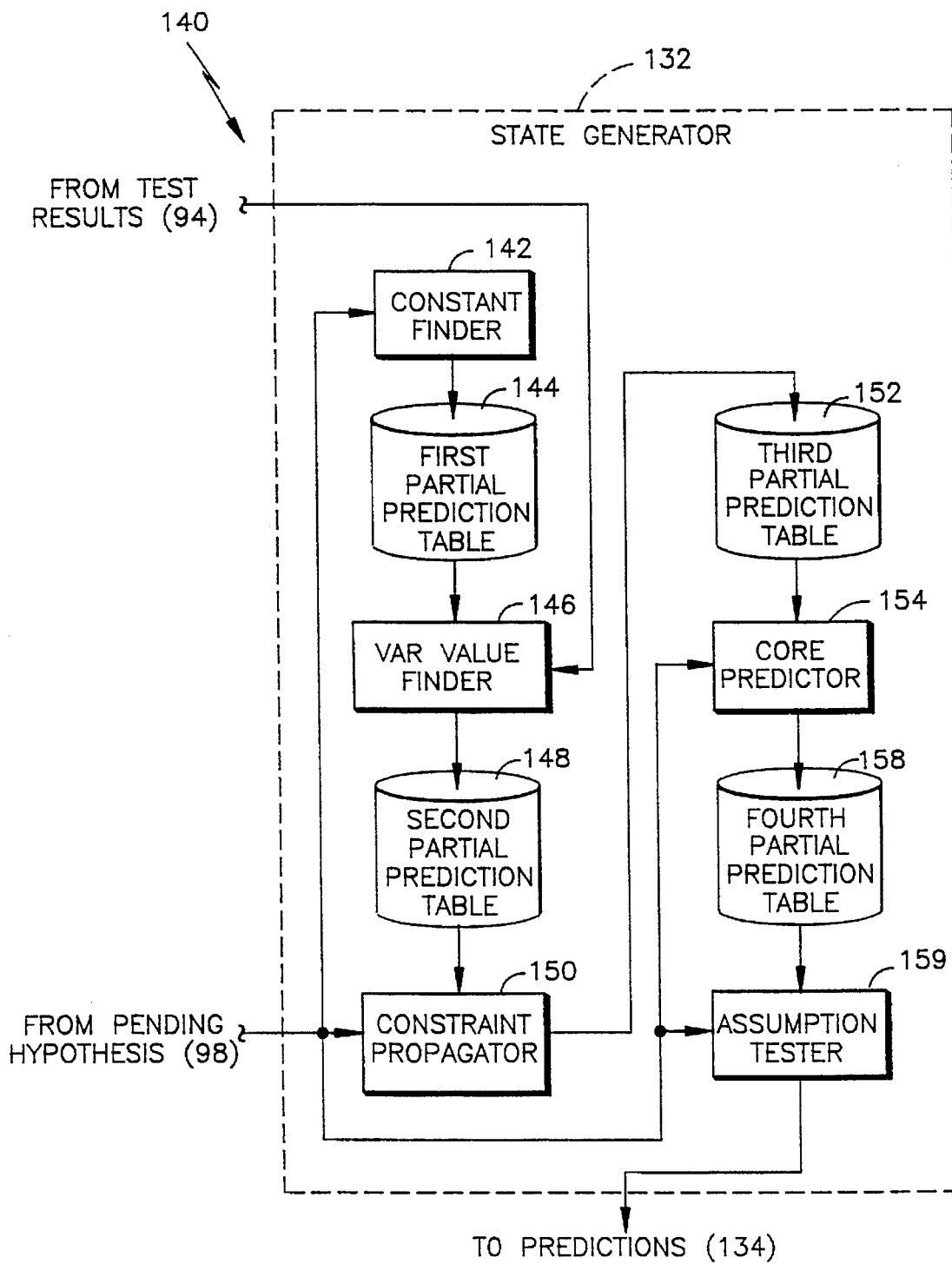
FIG. 7 is a dataflow diagram which illustrates operation of a state generator within the Qualitative Reasoning System software.

FIG. 7 is a dataflow diagram 140 which illustrates operation of the state generator 132 in more detail. A constant finder 142 is provided with the prediction table and the cached confluences table from the pending hypothesis data element 98. The constant finder 142 uses the cached confluences to iterate through the prediction table and fill in values for variables of the prediction table having confluences which define a variable in terms of a constant expression. For example, a battery may be described by a confluence wherein the voltage across the terminals of the battery is a constant positive voltage. The constant finder 142 outputs, to a first partial prediction table data element 144, the result of filling the constants into entries of the prediction table.

The first partial prediction table 144 and the test results data element 94 are provided as inputs to a variable value finder 146, which fills in values for variables of the first partial prediction table 144 that correspond to test results entered by the user. For example, if the user has measured the voltage across a resistor and entered the result, the variable value finder 146 would fill in the value for the variable in the first partial prediction table 144 corresponding to the resistor voltage. The variable value finder 146 outputs, to a second partial prediction table data element 148, the result of filling the variable values associated with test results into entries of the first partial prediction table 144.

The second partial prediction table 148 is provided as an input to a constraint propagator 150, which uses the variable values stored in the second partial prediction table 148 (i.e., the variable values which have already been determined by the constant finder 142 and the variable value finder 146 and possibly variables determined from a previous test of the hypothesis) and the cached confluences from the pending hypothesis data element 98 to determine the values for more of the variables. The constraint propagator 150 propagates the values of variables through the confluences to restrict the values of other variables of the hypothesis. For example, a confluence describing the flow of fluid through a valve may indicate that when the valve is open, the flow out of the valve equals the flow into the valve and when the valve is closed, the flow out of the valve equals zero. If the valve is determined to be open (a user observation) and the flow in is determined to be positive (a model constant), then the constraint propagator 150 can determine that the flow of fluid out of the valve is positive. Furthermore, if the output of a valve is connected to a pipe, the constraint propagator 150 may also determine the flow into and out of the pipe.

A variable wherein no possible qualitative variable values have been eliminated by, for example, the constraint propagator 150, is deemed an "unrestricted variable". An unrestricted variable can take on all of the values of the qualitative variable value space. A variable wherein at least one of the possible variable values has been eliminated is deemed a "restricted variable". A restricted variable may be either a "fully restricted variable" or a "partially restricted variable". A fully restricted variable is a variable wherein all but one of the possible qualitative variable values have been eliminated (i.e., a "known" variable). A partially restricted variable is a variable having at least one possible qualitative variable value eliminated but also having at least two possible qualitative variable values remaining.

Fully restricted and partially restricted variables of the hypothesis are propagated through the constraint propagator 150 in order to further restrict other variables of the hypothesis. A variable which is restricted by the constraint propagator 150 is thereafter propagated through the constraints with the other variables. The output of the constraint propagator is stored in a third partial prediction table 152. If the constraint propagator 150 detects an inconsistency for all of the possible values of a fully restricted or partially restricted variable, a null table is stored in the third partial prediction table data element 152.

The third partial prediction table 152 is provided as an input to a core predictor 154. If the third partial prediction table 152 is not a null table, the core predictor 154 iterates through the values for each of the unrestricted and partially restricted variables of the third partial prediction table 152 to determine if, given the values of the other variables, any of the possible values for a variable can be eliminated. For example, suppose the confluences for a switch indicate that if the switch is closed, the flow of current out of the switch equals the flow of current into the switch and that if the switch is open, the flow of current out of the switch is zero. Further suppose that the flow of current out of the switch is observed as a positive, non-zero, value. Core predictions would indicate that the only possible value for the state of the switch is closed since assuming that the switch is open results in an inconsistency (i.e., the switch can't be open and have a positive current flowing therefrom simultaneously). The output of the core predictor 154 is stored in a fourth partial prediction table data element 158.

Note that it is possible for the core predictor 154 to find an inconsistency for a particular hypothesis. For example, using the switch example from above, further assume that the input current to the switch is observed to be a negative value. It is inconsistent for the input current of a switch to be negative while the output current of the switch is positive, irrespective of whether the switch is open or closed. Therefore, the associated hypothesis which predicts a positive output current for the switch must not be valid. That is, the hypothesis associated with the cached confluences and third partial prediction table 152 being processed by the state generator 132 must be false. When this occurs, the core predictor 154 nulls (i.e., sets to null) the fourth partial prediction table 158.

The fourth partial prediction table 158 is provided as an input to an assumption tester 159 which determines if, given the predictions (i.e., the values of the variables that are restricted) contained in the fourth partial prediction table 158, at least one combination of values can be assigned to the variables that are not fully restricted which does not result in any inconsistencies. Of course, if the fourth partial prediction table 158 is a null table, the assumption tester 159 passes the null table to the predictions data element 134 so that the hypothesis tester 136 can discard the hypothesis.

However, assuming that the fourth partial prediction table 158 is not a null table, the assumption tester 159 assumes values for each of the variables that are not fully restricted and then determines if a consistent set of predictions can be derived from those values. The software uses a recursive routine which stores a value for a variable that is not fully restricted into the fourth partial prediction table 158 (thereby temporarily transforming the variable into a fully restricted variable), propagates all value restrictions, and then calls itself. If during the propagation phase an inconsistent set of predictions is generated, the assumption tester 159 backtracks through the recursion in order to assume different values for the variables. If a consistent set of values for all of the variables is found, the assumption tester 159 passes the fourth partial prediction table 158 (having restored variables to their original state) on through to the predictions data element 134. Otherwise, the assumption tester 159 provides a null table to the predictions data element 134.

While it is possible for the assumption tester 159 to randomly assign values to variables, doing so can be very inefficient of processor time because the number of random combinations can be quite large. For example, if there are twenty unrestricted variables each having three possible values, the number of random combinations is over three billion. Therefore, instead of randomly assigning values to variables, the assumption tester 159 uses dynamic assumption ordering to assign values to variables.

Dynamic assumption ordering is the process of locating target confluences, assigning a value to a variable which appears in the greatest number of target confluences, and propagating the variable assignment. A target confluence is a confluence wherein assigning a value to one of the variables of the confluence is likely to result in either the restriction of other variables or in an inconsistency, thereby allowing the hypothesis to be rejected. The most simple example of a target confluence is a confluence stating that variable V1 equals variable V2. If a value is assigned to the variable V1, the value for the variable V2 can be determined. Furthermore, it is possible to have a case wherein for every assignment of a value for V1, an inconsistency results, thereby allowing the assumption tester 159 to pass a null table to the prediction table data element 134. For example, assume that a first confluence states that the variable V1 equals the variable V2, a second confluence states that the variable V1 equals the negative of V2, and a third confluence states that the variable V1 equals the variable V2 plus a constant positive value. There is no combination of values which can solve the constraints placed on V1 and V2 by the three confluences. If the assumption tester 159 initially chooses either V1 or V2 for value substitution rather than randomly choosing variables which do not appear in target confluences, the inconsistency will be discovered sooner rather than later.

Note that, optionally, it is possible to use the constraint propagator 150 immediately following the constant finder 142. That is, the first partial prediction table 144 can be provided to the constraint propagator 150 which would provide an output to the variable value finder 146. This would be in addition to providing the constraint propagator 150 between the variable value finder 146 and the core predictor 154, thus effectively performing constraint propagation twice. Also note that it is possible to eliminate the assumption tester 159 from the system so that the fourth partial prediction table 158 would become the output of the state generator 132.

Figure 8:
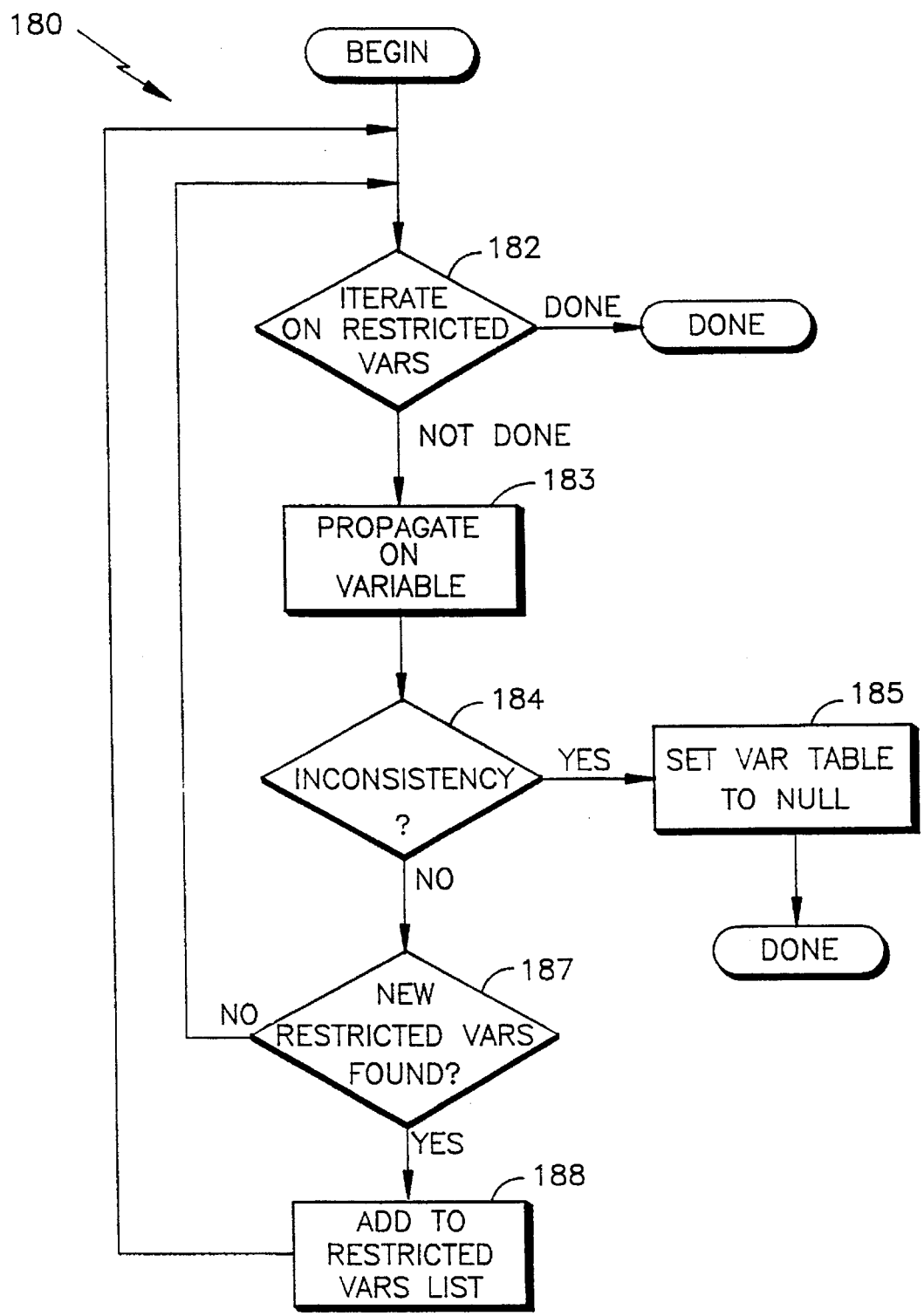
FIG. 8 is a flowchart illustrating steps of a constraint propagator within the state generator.

FIG. 8 is a flowchart 180 illustrating in more detail operation of the constraint propagator 150. At a first step 182, iteration through the restricted variables of the second partial prediction table 148 is controlled. At the step 182, an iteration counter is first initialized and then incremented for each subsequent execution. Note that the remaining steps of the flowchart 180 operate on one variable at a time. If the iteration counter has reached the end of the list of restricted variables of the second partial prediction table 148, execution is complete. Otherwise, control passes to a step 183, where all of the confluences associated with the variable (from the cached confluences table) are examined and other confluence variables are possibly restricted using all of the values of variables from the second partial prediction table 148. A value for a variable may be restricted at the step 183 if it is determined that the variable can equal a subset of the possible qualitative variable values for the variable. Note that all of the possible values of the restricted variable are propagated at the step 183 so that any further restrictions on other variables are the result of propagating all of the possible values of the restricted variable.

Control passes from the step 183 to a step 184 where a test is made to determine whether an inconsistency has been found at the step 183. An inconsistency occurs when two contrary predictions are made for the same variable (e.g. one subset of the confluences predicts that a certain variable is positive while a second subset of the confluences predicts that the same variable is negative). If an inconsistency is found at the step 184, control passes to the step 185 where the third partial prediction table 152 is nulled and execution of the constraint propagator 150 is terminated. Note that in the test for inconsistency at the step 184, an inconsistency is found only if all of the possible values of the restricted variable are inconsistent. For example, if the values of variable X, Y, and Z have been restricted to the values {minus, zero}, {zero, plus}, and {plus}, respectively, an inconsistency will be detected when the values are propagated through the confluence X=Y+Z. Resolving the left-hand side and right-hand side of the equation produces {minus, zero}={plus}, which is inconsistent regardless of any possible values that can be assigned to X, Y, and Z.

If no inconsistencies are found at the step 184, control passes from the step 184 to a step 187, where a test is made to determine if the values of any variables have been restricted at the step 183. It is possible that propagating values for one variable result in the further restriction of that variable or in the restriction of other variables. If new variable restrictions have been found, control passes from the step 187 to a step 188, where the newly restricted variables are added to the list of restricted variables. Control passes from the step 188 back to the step 182, where the iteration counter is incremented. If no new variable restrictions are found at the step 183, control passes from the step 187 back to the step 182.

Figure 9A:
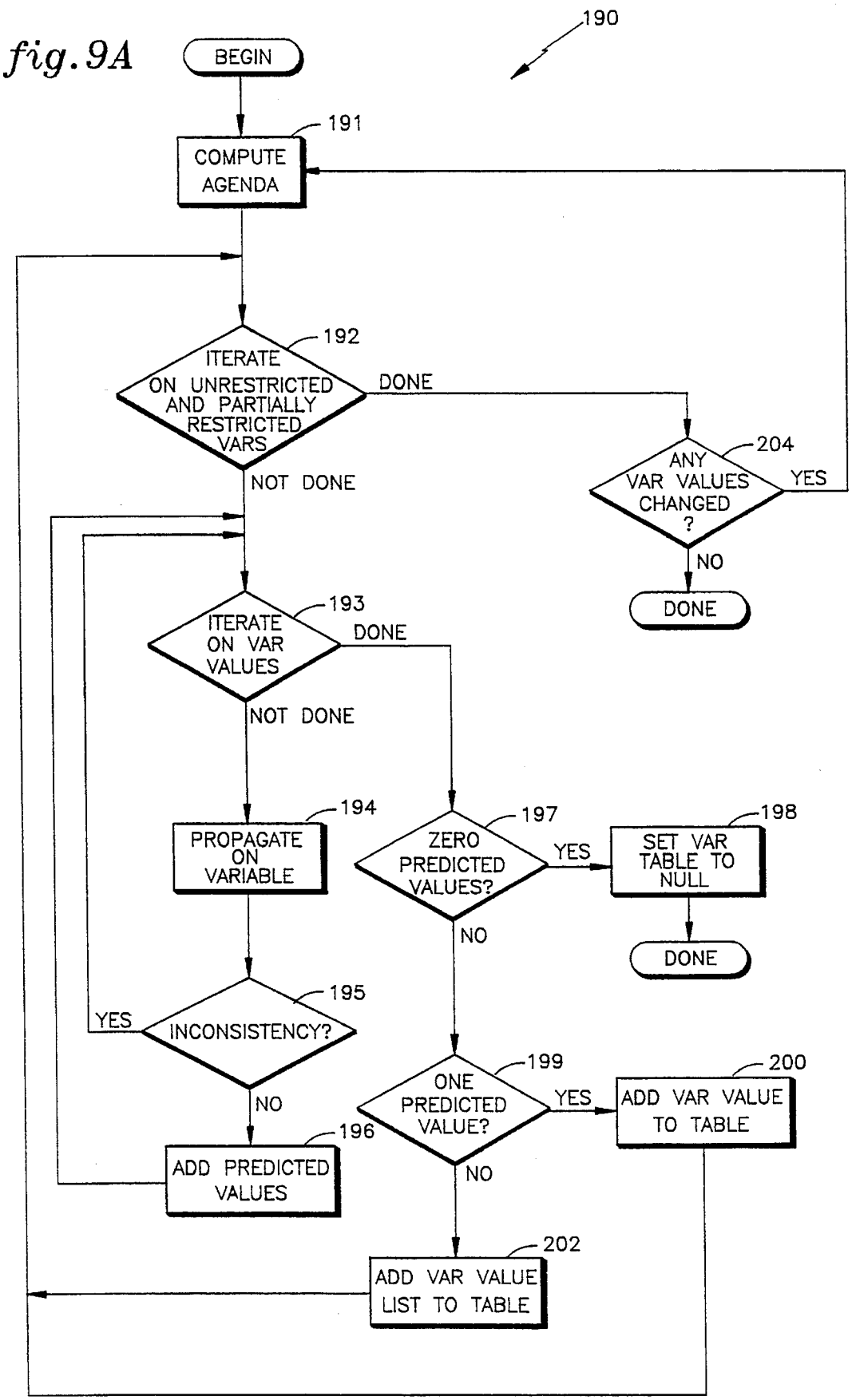
FIG. 9A is a flowchart illustrating operation of a core predictor within the state generator.

FIG. 9A is a flowchart 190 illustrating in more detail operation of the core predictor 154. At a first step 191, an agenda is computed. The agenda is a list of all of the unrestricted and partially restricted variables of the third partial predictions table 152 on which core predictions is to be performed. It is possible to compute an agenda at the step 191 that consists of all of the unrestricted or partially restricted variables of the hypothesis. That is, core predictions can be performed on all of the unrestricted and partially restricted variables of the hypothesis. However, as discussed in more detail hereinafter, it is possible to eliminate some of the variables from the agenda, thus decreasing processing time for the core predictions.

Following the first step 191 is a step 192 where iteration through the variables of the agenda is controlled. At the step 192, an iteration counter is first initialized and then incremented for subsequent execution on each of the variables of the agenda. Note that the remaining steps of the flowchart 190 operate on one variable at a time. If at the step 192 processing is not complete, control passes from the step 192 to a step 193 where the variable being operated upon is checked for one or more valid values. Note that since qualitative physics is being used to model the machine, all of the variables, including those which represent real world analog quantities, have a finite number of possible qualitative values. At the step 193, the variable is iteratively set to all of the possible qualitative values (one value at a time) which the variable could possibly equal prior to execution of the remaining steps. If at the step 193 the variable has not yet been set to all of the possible qualitative values, control passes from the step 193 to a step 194, where the variable value is propagated through the constraints. The step 194 is similar to the constraint propagation illustrated by the flowchart 180 at the step 183. Control passes from the step 194 to a step 195, where a test is made to determine whether propagating the assumed value for the variable through the confluences has resulted in an inconsistency. If so, control passes from the step 195 back to the step 193 for another iteration on the variable (i.e., another value is chosen for the variable).

If propagating the variable value through the confluences does not result in an inconsistency, control passes from the step 195 to a step 196, where the value is added to a list of possible values for the variable and values of other hypothesis variables that were restricted at the step 194 are saved. Control passes from the step 196 back to the step 193 in order to begin testing another value for the variable.

After all of the possible values for the variable have been propagated through the confluences, control passes from the step 193 to a step 197, where a test is made to determine if any of the predicted values for the variable have resulted in a consistent set of predictions. If there are no values for the variable which will result in a consistent set of predictions, control passes from the step 197 to a step 198, where the prediction table is nulled and execution is terminated. The hypothesis is not true because one of the variables can have no value which produces a consistent set of predictions. If there are not zero predicted values, control passes from the step 197 to a step 199, where a test is made to determine if there is only one value for the variable which results in a consistent set of predictions. If so, then the variable is fully restricted and control passes from the step 199 to the step 200, where the variable and the value are added to the fourth partial prediction table 158. If only one value of the variable results in a consistent set of predictions, the variable must equal that value for the hypothesis being tested to be true. Control passes from the step 200 back to the iteration step 192, where the next variable is tested.

If there is more than one value for the variable that does not result in an inconsistency, control passes from the step 199 to a step 202, where the variable being tested is set to a list containing more than one value that resulted in a consistent set of predictions. That is, the variable is set to the list of possible values for the variable that was constructed at the step 196. For example, if the variable V1 has a value space of $\{-\infty, -max, -min, zero, min, max, +\infty\}$, and if at the steps 194, 195 only zero and max did not result in an inconsistency, then V1 is partially restricted and is set to the list $\{zero, max\}$ at the step 202.

After setting a variable to a value list at the step 202, predictions for other variables (i.e., other than the iteration variable) can be determined by taking the union of the implicants (i.e., the resulting values for the other variables after propagation) stored at the step 196. For example, if the variable V1 is set to the value list $\{-min, zero\}$, then additional predictions for other variables are determined during propagation of $-min$ for V1 and propagation of zero for V1. The resulting possible values for the remaining variables is the union of possible values obtained by each separate propagation step. Note that it is possible in some instances to assign a value list to a first variable and cause a single value to be assigned to a second variable on subsequent iterations. For example, if a confluence states that $X=Y+Z$, and Y is determined to be positive (either by a direct measurement or a previous propagation of variable values), then assigning the value list $\{zero, plus\}$ to Z during core predictions results in X being assigned a single value of plus. This occurs because propagating zero for Z results in X being plus and propagating plus for Z results in X being plus and the union of the possible values for X results in X being only plus.

If all of the variables of the agenda have been operated upon at the step 192, control passes from the step 192 to a test step 204 to determine if the value of any of the variables of the agenda changed as a result of the previous iteration of core predictions (i.e., the most recent pass through all of the variables of the agenda). If not, then processing is complete since it would not be possible to derive additional variable values through core predictions.

If at the test step 204 it is determined that variable values have changed during the most recent iteration of the core predictions, then control passes from the step 204 back to the step 191 to recompute the agenda.

As discussed above, it is possible to include all of the unrestricted and partially restricted variables in the agenda. Alternatively, on second and subsequent iterations through the agenda, the variables placed on the agenda may be limited to those variables which, as a result of value restrictions discovered on the previous iteration, may produce new value restrictions in the current iteration. These variables are the unrestricted or partially restricted variables (and covariates thereof) having values that changed on the previous iteration. This eliminates from the agenda variables which are not likely to result in new value restrictions, thereby reducing processing time.

As described above, the core predictor 154 may use an alternating cycle of creating an agenda and then performing core predictions on variables of the agenda. Alternatively, it is possible to compute an agenda continuously while performing core predictions. In this mode, the core predictor 154 would add variables to the agenda as soon as it is determined that the variables satisfied the criteria for inclusion in the agenda. The core predictor 154 would then terminate execution when no variables remained on the agenda.

In addition, it is possible to treat the set of variables on the agenda as a set of candidate variables, and further remove variables at each iteration by examining the confluences in which the candidate variables appear. Variables which remain on the agenda are those that are likely to either be restricted or cause other variables to be restricted on the next iteration. Variables which appear only in unconditional confluences with fewer than three unrestricted or partially restricted variables or appear in postconditions of conditional confluences with fewer than three unrestricted or partially restricted variables may also be eliminated from the agenda. A postcondition is the THEN portion of an IF-THEN statement. Removing variables from the agenda this way eliminates from the agenda additional variables which are not likely to result in new value restrictions, thereby further reducing processing time.

Figure 9B:
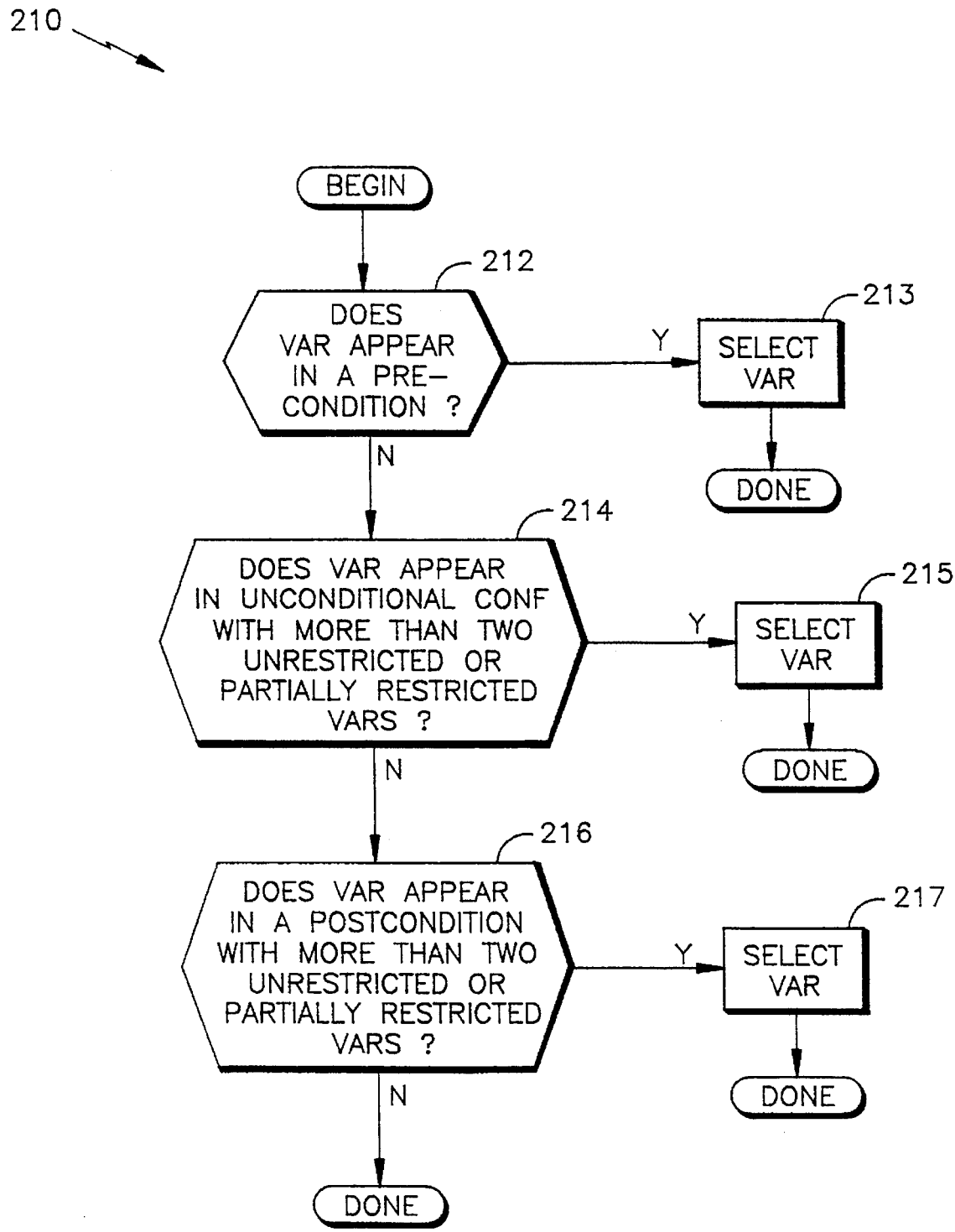
FIG. 9B is a flowchart illustrating selection of variables for performing core predictions thereon.

FIG. 9B is a flowchart 210 that shows testing of a variable to determine if the variable should be selected for performing core predictions thereon (i.e., placed on the agenda). At a first step 212, a test is made to determine if the variable appears in a precondition of a confluence. A precondition is the "IF" portion of an IF-THEN statement that causes the "THEN" portion to be true. For example, in the confluence "If X=0 then Y=2", the variable X appears in a precondition.

If it is determined at the step 212 that the variable being examined appears in a precondition of a confluence, then control passes from the step 212 to a step 213, where the variable is selected to be added to the agenda. Otherwise, control passes from the step 212 to a step 214 to determine if the variable appears in an unconditional confluence containing greater than two unrestricted or partially restricted variables. If so, then control passes to a step 215 where the variable is selected for addition to the agenda. Otherwise, control passes from the step 214 to a test step 216.

At the test step 216, it is determined if the variable being examined appears in a confluence postcondition with more than two unrestricted or partially restricted variables. If the variable appears in a postcondition with more than two variables, control passes from the step 216 to a step 217 where the variable is selected for addition to the list of core prediction variables. Otherwise, the variable is not added to the agenda and core predictions are not performed on the variable.

Figure 10:
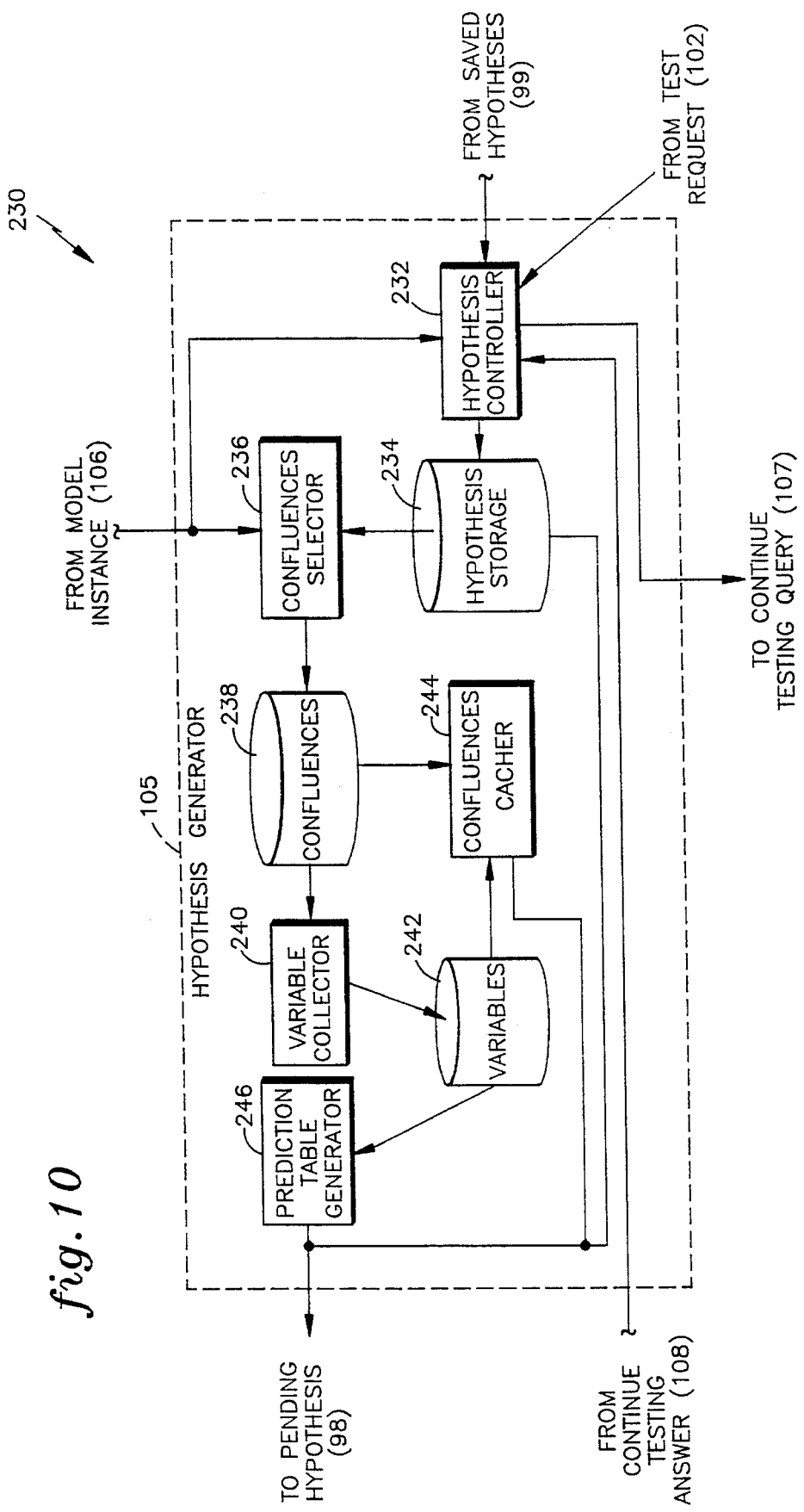
FIG. 10 is a dataflow diagram illustrating operation of a hypothesis generator within the Qualitative Reasoning System software.

FIG. 10 is a dataflow diagram 230 which illustrates operation of the hypothesis generator 105. The hypothesis generator 105 generates hypotheses by a number of methods: The hypothesis generator 105 can create new hypotheses by expanding components associated with existing hypotheses from the saved hypotheses data element 99. The hypothesis generator 105 can create new hypotheses by assuming a greater number of simultaneous component failures. And, the hypothesis generator 105 can pass existing hypotheses and associated predictions from the saved hypotheses data element 99 to the pending hypothesis data element 98.

Data from the test request data element 102 is provided to a hypothesis controller 232, which upon detecting that the test request data element 102 is empty, uses information from the model instance data element 106 to create new hypotheses by expanding, into subcomponents, the components associated with hypotheses from the saved hypotheses data element 99. For example, if the saved hypotheses data element 99 contains a single hypothesis which assumes that the machine power supply has failed, the hypothesis controller 232 would create a plurality of hypotheses corresponding to failure of the subcomponents of the power supply (e.g. capacitors, transformer, bridge rectifier, etc). The hypothesis controller 232 can determine the subcomponents of a component because the model instance data element 106 contains data structures which identify the subcomponents of each compound component.

If the saved hypotheses data element 99 is empty, the hypothesis controller 232 writes data to the continue testing query data element 107 in order to determine if the user wishes to continue failure isolation with a set of hypotheses having one more failed component than the previous set of hypotheses. The user's answer is provided in the continue testing answer data element 108, which is provided as an input to the hypothesis controller 232, which uses the answer to determine whether to continue generating hypotheses.

If the test request data element 102 is not empty (i.e., the intelligent test selection 100 has prompted the user to perform a test), the hypothesis controller 232 passes hypotheses from the saved hypotheses data element 99 to the pending hypothesis data element 98 for further testing by the hypothesis tester 96. A hypothesis which predicts a unique qualitative value for a variable which the user has been prompted to supply (i.e., the test stored in the test request data element 102) is not passed on since further testing could neither predict any new values for the hypothesis nor eliminate the hypothesis. For example, suppose that the saved hypotheses data element 99 contains hypothesis A, which predicts a positive fluid flow through a particular conduit and hypothesis B which makes ambiguous predictions about the flow through the same conduit. If the test request data element 102 contains a prompt for the user to observe the fluid flow through the conduit, then the hypothesis controller 232 would pass hypothesis B to the pending hypothesis data element 98 (because hypothesis B makes ambiguous predictions about the fluid flow) but would not pass hypothesis A to the pending hypothesis data element (because hypothesis A predicts a positive fluid flow through the conduit). Note that if the user actually observes a negative or a zero fluid flow through the conduit, the hypothesis updater 104 would eliminate hypothesis A from the saved hypotheses data element 99.

The hypothesis controller 232 stores hypotheses (either newly generated hypotheses or hypotheses from the saved hypotheses data element 99) in a hypothesis storage data element 234. The hypothesis storage data element 234 is provided as an input to a confluence selector 236 which uses data from the model instance data element 106 to determine the model confluences for each hypothesis stored in the hypothesis storage data element 234. The confluence selector 236 stores the confluences in a confluences data element 238.

The confluences data element 238 is provided as an input to a variable collector 240 which determines the unique variables for each set of confluences and stores the output in a variables data element 242. The variables data element 242 and the confluences data element 238 are provided as inputs to a confluence cacher 244, which creates a cached confluences table, a table of confluences that can be indexed by each variable wherein each element of the table contains all of the confluences in which the index variable appears (e.g. variable V1 appears in confluences C1, C5, and C6, variable V2 appears in confluences C2 and C5, etc.). The cached confluences table is used by the hypothesis tester 96 to test hypotheses without having to search confluences for the occurrence of variables.

For newly created hypotheses, the variables data element 242 is provided as an input to a prediction table generator 246 which generates an empty prediction table. For hypotheses which are obtained from the saved hypotheses data element 99, the already existing prediction table (having some variable values already determined) is used. The output of the hypothesis generator 105, which is written to the pending hypothesis data element 98, is a set of hypotheses (one at a time), an associated cached confluences table for each of the hypotheses, and an associated prediction table for each of the hypotheses.

In some instances, it is possible for the hypothesis generator 105 to provide some values for variables in the prediction table of a newly generated hypotheses. If a new hypothesis is created in response to hierarchically expanding an existing hypothesis into subcomponents, then variables in the new hypothesis which correspond to variables in the parent hypothesis can be set equal to the values that may have been assigned to the variables during analysis of the parent hypothesis. For example, if a parent hypothesis corresponds to a fault in the fuel system, and if prior analysis of the parent hypothesis included assigning a value to a variable representing the inlet flow of fuel into the system, then it is possible to assign the same known value to any variable in a fuel system subcomponent hypothesis (e.g. fuel pump, intake valve, etc.) that corresponds to the inlet fuel flow variable of the parent hypothesis.

As described above, the candidate variables on the first iteration through the agenda by the core predictor may be computed to be all unrestricted and partially restricted variables in the hypothesis. Alternatively, the variables may be further limited to the unrestricted and partially restricted variables which appear in confluences added by the child hypothesis (i.e., confluences that were not in the parent hypothesis). This creates a small candidate list that contains no variable that has previously been operated upon by the core predictor for any ancestor hypothesis of a child hypothesis. In practice, most, but not all, of the value restrictions computed by the core predictor using the larger candidate list are also computed by the small agenda.

In addition, additional candidate variables which have previously been operated upon by the core predictor on an ancestor hypothesis of a child hypothesis may be selectively added to the small candidate list on the first iteration through the agenda by the core predictor. These variables may include variables that were restricted by the constraint propagator prior to entering the core predictor, and "recursive covariates" thereof. Variable X is a recursive covariate of variable Y if X is either a covariate of Y (i.e., X appears in a confluence with Y) or X is a covariate of a recursive covariate of Y. For example, given three equations X=Z, Z=W, W=Y, X is a recursive covariate of Y since X is a covariate of Z, which is a recursive covariate of Y. Z is a recursive covariate of Y since Z is a covariate of W, which is a covariate of Y. Additionally, variables present in the parent hypothesis that are recursive covariates of the variables added by the child hypothesis may also be added to the agenda.

The core predictions agenda may also be used to reduce the amount of computation performed by the hypothesis tester 96 after receiving a test result associated with a variable value. As described above, the candidate variables on the first iteration through the agenda by the core predictor may be computed to be all unrestricted and partially restricted variables. Alternatively, the candidate variables may include all variables that are not fully restricted which are directly associated with the test result (or covariates thereof) or are variables (or covariates thereof) that are restricted by the constraint propagator 150 based on the test result. This creates a small candidate list that excludes many unrestricted or partially restricted variables that are not affected by the test result, and thus are not likely to produce new value restrictions by the core predictor.

FIG. 11 is a dataflow diagram 260 illustrating in detail operation of the intelligent test selection 100. Input from the saved hypotheses data element 99 and the saved prediction tables data element 118 is provided to a test classifier 262. The test classifier 262 examines the predictions along with any component health assessment that may be associated with each test and classifies each of the tests for the model into either a type I test, a type II test, or a type III test, wherein a type I test is a test that a user can perform that is guaranteed to allow at least one hypothesis from the saved hypotheses data element 99 to be discarded, a type II test is a test that may or may not allow a hypothesis to be discarded, and a type III test is a test guaranteed not to allow a hypothesis to be discarded. The output of the test classifier 262 is stored in a classified tests data element 264. Note that tests that require a machine configuration change from the current machine configuration to another configuration are evaluated in terms of the saved predictions in the saved predictions table 118 that correspond to the other configuration.

As an example of test classification, suppose that the saved hypotheses data element 99 contains hypothesis A and hypothesis B, and that hypothesis A predicts that a particular current flow will be greater than or equal to zero while hypothesis B predicts that the same current flow will be less than zero. The test classifier 262 would deem a test that measures the current flow to be a type I test, since having the user observe (and input to the QRS) the flow is guaranteed to eliminate either hypothesis A or hypothesis B, irrespective of the actual value of the current flow. Continuing the example, further assume that hypothesis A predicts a voltage greater than or equal to zero at a particular point and that hypothesis B predicts a voltage less than or equal to zero at the same point. The test classifier 262 would deem the voltage measurement to be a type II test since having the user observe the voltage may or may not eliminate either hypothesis A or hypothesis B. If the user measures a voltage of zero, then neither hypothesis A nor hypothesis B can be eliminated but if the user measures a non-zero voltage, either hypothesis A or hypothesis B can be eliminated. Further continuing the example, assume that both hypothesis A and hypothesis B make completely ambiguous predictions about a particular fluid flow. Then the test classifier 262 would deem the fluid flow to be a type III test.

Input from the saved hypotheses data element 99 and the saved prediction tables data element 118 is provided to a test result payoff generator 266, which, for each possible test result, determines the sum of the probabilities of particular faults assumed by hypotheses from the saved hypotheses data element 99 that would be discarded if the test result equaled a particular value. For example, suppose that the saved hypotheses data element 99 contains ten hypotheses of equal likelihood and that three of the hypotheses predict that a particular current flow will be positive or zero, four of the hypotheses predict that the same current flow will be negative, and the remaining three hypotheses make completely ambiguous predictions about the current flow. The payoff for a positive current flow would be four tenths and the payoff for a negative current flow would be three tenths. The output of the test result payoff generator 266 is stored in a payoff data element 268. Note that it is possible to also calculate the test result payoff using only the number of hypotheses that would be discarded without factoring in the likelihood of those hypotheses.

Input from the saved hypotheses data element 99, the saved prediction tables data element 118, and from the component information data element 101 is provided to a hypothesis probability generator 270, which uses empirical or estimated component failure rate information from the component information data element 101 to predict the probable validity of each hypothesis from the saved hypotheses data element 99. Output from the hypothesis probability generator 270 is stored in the hypothesis probabilities data element 272.

The hypothesis probabilities data element 272, the saved prediction tables data element 118 and the saved hypotheses data element 99 are provided as inputs to a test result probability generator 274, which predicts the likelihood of each possible test result for each test. Measuring a value of a variable which is predicted by a hypothesis having a high probability is more likely than measuring a value of a variable which is predicted by a hypothesis having a low probability. For example, assume that the saved hypotheses data element 99 contains hypothesis A which predicts that a particular fluid flow will be zero and hypothesis B which predicts that the same fluid flow will not be zero. Further assume that hypothesis A is deemed by the hypothesis probability generator 270 to have an eighty percent probability and hypothesis B is deemed by the hypothesis probability generator 270 to have a twenty percent probability. Then the test result probability generator 274 will determine that there is an eighty percent chance that the fluid flow will be observed by the user to be zero and a twenty percent chance that the fluid flow will be observed by the user to be non-zero.

Output from the test result probability generator 274 is stored in an expected probabilities data element 276 which, along with the payoffs data element 268, is provided as input to a test utility generator 278. For each test, the test utility generator 278 determines the utility of having the user perform the test by calculating the sum of the products of the expected probability and the payoff for each result that the test can have. For example, suppose a test that measures the value of variable X has three possible results: minus, zero, and plus. Further assume that the payoff for measuring the variable as minus is one tenth, the payoff for measuring the variable as zero is two tenths and the payoff for measuring the variable as plus is six tenths. Also assume that the probability that X is minus is twenty-five percent, the probability that X is zero is fifteen percent, and the probability that X is plus is sixty percent. The utility of measuring the variable X is determined by the following equation:

$$\text{Utility of } X = (0.10 \times 0.25) + (0.20 \times 0.15) + (0.60 \times 0.6)$$

The output of the test utility generator 278 is stored in a test utility data element 280 which, along with data from the component information data element 101 and the test configuration data element 119, is provided as input to a test score generator 282. The test score generator 282 divides the test utility of each test by the test time for each test (from the component information data element 101) in order to provide a test score for each test which is stored in a test score data element 284. For each of the tests, the test score generator 282 determines the desirability of prompting the user to perform the test (i.e., measuring a machine parameter and/or making a component health assessment). For two tests having the same utility, the one which takes longer for the user to measure will have a lower test score. Furthermore, some tests, such as the internal frictional force of a mechanical part, may be impossible for the user to perform and may be assigned a test time which approaches infinity. A thorough discussion of the theory behind test score generation can be found in Von Neumann, John and Morgenstern, Oskar "Theory of Games and Economic Behavior", Princeton, Princeton University Press, 3rd edition (1953).

The test scores data element 284 and the classified tests data element 264 are provided as inputs to a test selector 286, which attempts to determine the best test for the user to perform. The test selector 286 is also provided with a third input from a thresholds data element 288, which contains threshold values for each of the types of tests (for the current embodiment, the threshold for type I tests is 0.001 and the threshold for type II tests is 0.001, although thresholds of 5 and 100 can also be used for type I and type II tests, respectively). The test selector 286 chooses a type I test (i.e., a test guaranteed to eliminate at least one hypothesis from the saved hypotheses data element 99) having the highest test score. However, if the highest scoring type I test has a score less than the threshold for type I tests, then the test selector 286 chooses the highest scoring type II test having a test score higher than the threshold for type II tests. If there are no type I or type II tests having a test score higher than the respective thresholds, the test selector 286 chooses no tests. The output of the test selector 286 is written to the test request data element 102. Note that if the test selector 286 writes nothing to the test request data element 102, the hypothesis generator 105 detects that the test request data element 102 is empty and begins expanding hypotheses from the saved hypotheses data element 99.

Alternatively, it is possible to modify the above-described technique for selecting a test by selecting a type I test or a type II test having the highest score without favoring type I tests. That is, a type II test with a higher score than any type I test can be selected in favor of a type I test even though the score of the highest scoring type I test exceeds the predetermined threshold. Also, it is possible to have two sets of type I and type II thresholds so that one set of thresholds is used for hypotheses having substructure associated therewith (i.e., hypotheses representing compound components not at the bottom of the model hierarchy) and the other set is used for hypotheses having no substructure (i.e., hypotheses representing elementary components at the bottom of the hierarchy). The test selector 286 detects the different conditions by examining data from the saved hypotheses data element 99 and the saved prediction tables data element 118.

Each of the hypothesis variables can have associated therewith one or more of the test procedures. The test procedures can be either an assessment of component health or a determination of the value of one or more variables. Therefore, the processing described above in connection with FIG. 11 can be performed on a per variable, rather than a per test procedure, basis. In that case, each variable would be rated as a type I, II, or III variable depending upon the effect of the associated test on remaining hypotheses. The score of each variable can also be calculated in the manner described above in connection with calculating a score for each test.

A test procedure could also include steps to prompt a user to alter machine control inputs or otherwise alter the configuration of the machine. In that case, the user would perform the requested steps and then confirm that the steps were performed so that the QRS could save the hypothesis prediction tables and user test results associated with the previous configuration in the manner described above in connection with FIG. 4.

The test score generator 282 is illustrated above as calculating the test score using a static value for the test time for a test. That is, the description above assumes that the cost of performing a particular test is invariate irrespective of previous tests that have already been performed on the machine. Alternatively, it is possible for the test score generator to receive information from the test configuration data element 119 and to then dynamically calculate the cost of performing a particular test procedure based on the current test configuration of the machine. For example, assume a machine has a first and a second access panel and that the first panel has been removed for a previously performed test but that the second panel has not been removed. Given a first test requiring a prestep of removal of the first panel and a second test requiring a prestep of removal of the second panel, and all other factors being equal, it is more efficient to perform the first test since the first access panel has already been removed.

The cost of a test procedure is dynamically calculated by first summing the cost of each step and prestep of the test procedure that has not already been performed. Then the test configuration is determined by examining data from the test configuration data element 119. The cost of any step or prestep that becomes unnecessary due to the present value of the test configuration is not included in the calculated sum of the costs of the steps. For example, if a test procedure includes a step of removing an access panel, and if the access panel was removed during a previous test procedure, then the final cost of the test procedure will not include the time it takes to remove the access panel.

Figure 12A:
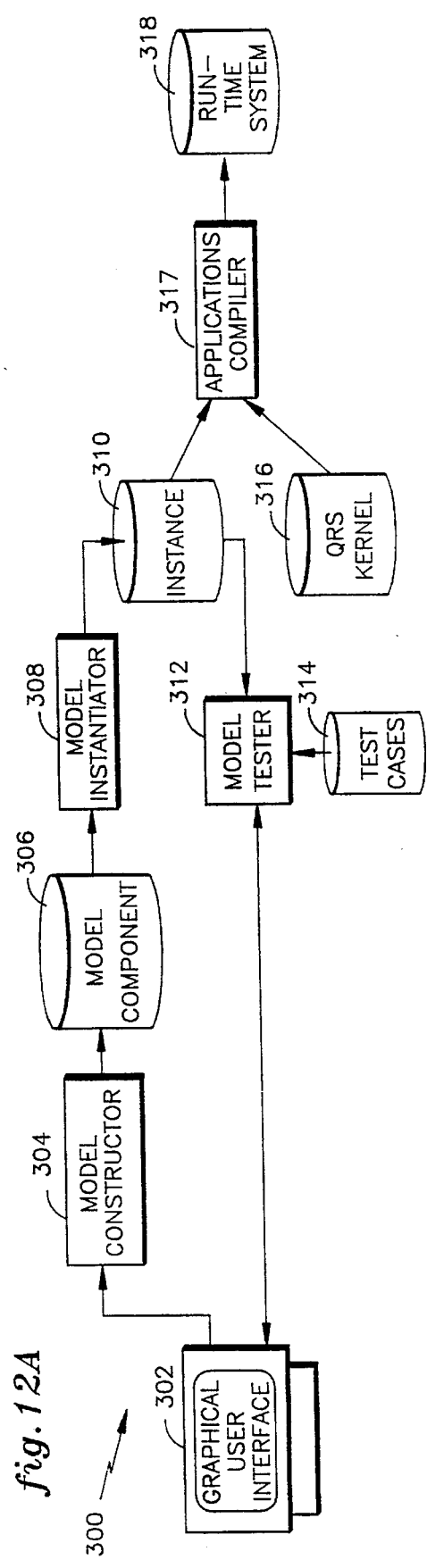
FIG. 12A is a dataflow diagram illustrating a model builder.

FIG. 12A is a dataflow diagram 300 illustrating a model builder, which produces the model instance data element 106 that is used by the QRS software. The model instance data element 106 is constructed off-line by running the model builder on a computer workstation, such as a SPARCstation 10 Model 41 manufactured by Sun Microsystems Inc. of Mountain View, Calif., and is then transferred to the PMA 30 to become part of the QRS software.

Input to the model builder is through a graphical user interface 302, which is described in detail in "HELIX: A Helicopter Diagnostic System Based on Qualitative Physics", Hamilton, Thomas P., International Journal of Artificial Intelligence in Engineering, Vol. 3, No. 3 July, 1988, pp 141–150. User input from the graphical user interface 302 is provided to a model constructor 304, which processes the user input to produce a model component data file 306 to be stored on the disk of the workstation. The model component data file 306 contains definitions of elementary model components (i.e., terminals and confluences of elementary components) and definitions of compound model components, which the user can create by interconnecting elementary components or by interconnecting other compound components. The data stored in the model component data file 306 is in the form of Common Lisp expressions, the construction of which is known to those skilled in the art. The interconnections of the components in the component data file 306 define the model hierarchy so that at the lowest level of the hierarchy are the elementary components and at the highest level of the hierarchy is a single compound component which represents the machine being modeled.

The user accesses the graphical user interface 302 to specify test procedures for parameters and/or components of the model being constructed. The user specifies the prompt text for the test, the cost, the preconditions, the presteps, and the other information associated with test procedures, discussed elsewhere herein. Some of the procedures may be constructed from generic test procedure templates already stored in the workstation 302. For example, a generic template for testing the current in a wire can be used as a basis for providing a specific test procedure for a specific wire. Also, where appropriate, a test procedure can be specified in the form of a component health assessment where one or more machine failure hypotheses can be tested by prompting the user to examine and provide information indicative of the health of one or more machine components, thus integrating the QRS with aspects of rule based fault isolation systems (i.e., correlating specific symptoms with specific component failures). For example, testing for damage to a switch contact assembly might be carried out by asking the user if the switch contact assembly shows evidence of burnt or damaged contacts and having the user respond "YES" or "NO".

Landmark domains can be used during the model building process. The landmark domains and other landmark relationships can act as templates for constructing value spaces for qualitative variables. This shortens the time it takes to build a model by not requiring the user to separately specify the qualitative value space for each variable. Also, using landmark domains insures that similar and/or connected variables will have identical qualitative value spaces and identical mappings between qualitative and quantitative values. For example, two pipes which are interconnected can have value spaces of $\{-\infty, -max, -min, zero, min, max, +\infty\}$ to describe the flow therethrough. Without using landmark domains, a model builder may inadvertently exclude min for one of the pipes, thus causing difficulties when comparing and operating on the separate variables that represent the qualitative flows through the pipes. However, using landmark domains allows the user to define both value spaces for both flow variables in a way that facilitates comparisons and calculations. Also, test procedure templates can be used during run-time so that a test procedure that is specified generically for a type of component or parameter can be applied to a specific component or parameter during fault isolation.

The component data file 306 is provided as an input to a model instantiator 308, which converts the component data file 306 into a format optimized for processing by the QRS software on the PMA 30. The result of the conversion by the model instantiator 308 is output to an instance data file 310, which is stored on the disk of the workstation and which can be transferred to the QRS software on the PMA to become the model instance data element 106. The conversions performed by the instantiator 308 include conversion of confluences from infix notation to prefix notation, extraction of keywords from conditional confluences, presorting the variables used in each confluence for fast access, and converting the data types of variables from Common Lisp lists of attributes to Common Lisp symbols.

The instantiator 308 also reduces the number of constraints and variables of the model by constraint reduction. Constraint reduction involves examining the confluences of a component and eliminating simple confluences having the form V1 equals V2 or V1 equals −V2 where no more than one of the variables is a testable variable (i.e., is associated with a test procedure). The other variable may be a testable or an untestable variable. One untestable variable and the simple confluence are eliminated by substituting the other variable (or the negation of the other variable in the case of a simple confluence of the form V1 equals −V2) for the untestable variable in all of the confluences for the component. Substitution is warranted when the possible qualitative values for the untestable variable are a subset of the possible qualitative values for the other variable.

The constraint reduction process begins at the lowest level of the model hierarchy. Variables which are eliminated at the lowest level are also eliminated from higher levels of the hierarchy. At subsequent levels of the hierarchy, it is likely that more variables can be eliminated because new confluences, such as interconnections between components, are introduced.

For the QRS to operate properly, the instance data file 310 must contain a correct representation of the system which is being modeled. The instance data file 310 is provided as an input to a model tester 312, which interacts with the user via the graphical user interface 302 to exercise components of the instance data file 310. The model tester 312 exercises components by using qualitative physics to generate operational states of a component and provide information about those states to the user via the graphical user interface 302. For example, for a valve residing in the instance data file 310, the component tester 312 may generate a first state wherein the valve is closed and the flow out of the valve and the flow into the valve is zero, a second state wherein the valve is open, the flow into the valve is positive, and the flow out of the valve is positive, a third state wherein the valve is open, the flow into the valve is negative and the flow out of the valve is negative, and a fourth state wherein the valve is open, the flow into the valve is zero and the flow out of the valve is also zero.

Generating states allows the user to debug a component model. If the user has provided too many constraints for the component, the model tester 312 will fail to generate all of the possible states for the component. For example, using the valve example from above, if the user erroneously provides too many constraints for the valve, the model tester 312 may only generate three of the four operational states shown above. Similarly, if the user provides too few constraints, the model tester 312 may generate extra, illegal states. For example, using the valve example from above, if the user does not provide a constraint for the valve specifying that the flow in and out of the valve is zero when the valve is closed, the model tester 312 may generate a state wherein the valve is closed and the flow in and flow out of the valve is a positive non-zero value.

The user may also optionally create a test cases data file 314, which is stored on the disk of the workstation. The test cases data file 314 contains predetermined sets of assigned values for variables of components stored in the instance data file 310. For example, the test cases data file 314 may contain a first and second set of assigned variable values for an electrical resistor, wherein for the first set, the current through the resistor is positive and the voltage across the resistor is positive and wherein for the second set the current through the resistor is negative and the voltage across the resistor is also negative. Note that the test cases data file 314 need not contain all of the test cases for a particular component. For the resistor example above, the case wherein the current and voltage for the resistor are zero is not used.

Furthermore, the test cases data file 314 may contain invalid cases, i.e., a set of values for variables of a component which violate the confluences of the component. For example, the test cases data file 314 may contain a case for a resistor wherein the voltage across the resistor is positive and the current through the resistor is negative. The test cases data file 314 is provided as an input to the component tester 312, which substitutes values from the predetermined sets of cases into variables of the component being tested. The component tester 312 reports the result to the user via the user interface 302. A string, which is provided with each case in the test cases data file 314 by the user at creation time, is also reported to the user via the user interface 302 so that, for example, a string for an invalid case would identify the case as such.

A QRS kernel data element 316 contains the run-time code for the QRS system described herein in connection with FIGS. 1–11. The QRS kernel 316 and the model instance 310 can be ported as is (i.e., as separate elements) to the PMA 30 or other suitable processing device for performing fault isolation. The QRS kernel 316 and the model instance 310 can also be combined by an applications compiler 317 to provide a deliverable run-time system 318 that is ported to the PMA 30 or other appropriate processing device. The run-time system 318 executes on the PMA 30 or other appropriate computer. The applications compiler 317 can be executed either on the PMA 30 prior to or during fault isolation or on the computer used to build the model.

It is possible for the application compiler 317 to precompile portions of the QRS kernel 316 and combine portions of the QRS kernel 316 with portions of the model instance 310. Precompiling and combining improves the response time of the run-time system 318 at the expense of flexibility.

The application compiler 317 can precompile and combine the QRS kernel 316 and the model instance 310 by precomputing the hypotheses and predictions for a given set of initial symptoms. The user enters a presupposed initial set of symptoms and the applications compiler 317 uses the model instance 310 and the QRS kernel 316 to generate an initial set of hypotheses in the manner described elsewhere herein in connection with FIGS. 1–11. The resulting run-time system 318 allows for dynamically performing test selection, but diagnosis is initiated from the fixed set of initial machine conditions provided by the user, The application compiler 317 can also precompile and combine the QRS kernel and the model instance by precomputing an entire set of diagnostic logic trees that assume an initial set of symptoms provided by the user. The response time of the resulting run-time system 318 is relatively rapid, but the system 318 lacks flexibility to select tests or provide fault isolation for symptoms not anticipated at the time of creation.

Figure 12B:
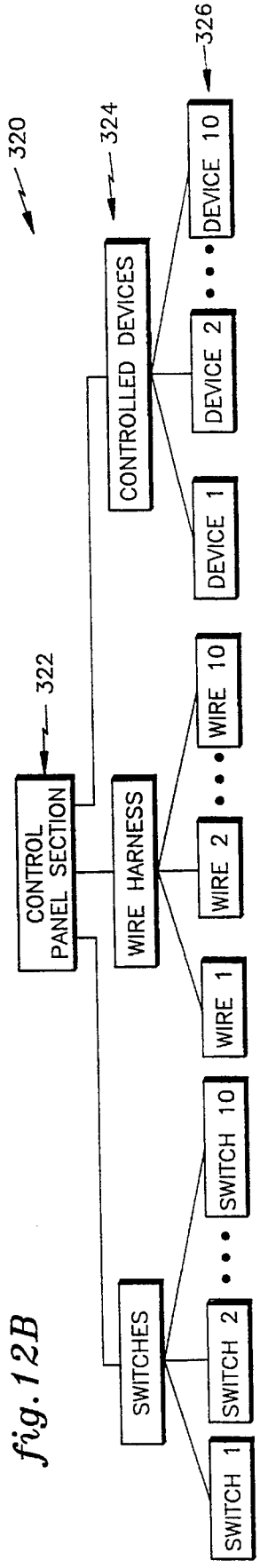
FIG. 12B is a schematic diagram of a model hierarchy.

FIG. 12B is a schematic diagram that shows a model hierarchy having a first, highest, level 322, a second, intermediate, level 324, and a third, lowest, level 326. The highest level 322 represents a control panel section. Subcomponents of the control panel section are shown at the intermediate level 324 and include switches, a wire harness, and controlled devices. The third level 326 shows that the subcomponents of the switches, wire harness, and controlled devices are, respectively, switches one through ten, wires one through ten, and devices one through ten.

During fault isolation, if a hypothesis corresponding to a fault in the control panel section cannot be disproved (i.e., remains in the saved hypotheses data element 99), then eventually the control panel section hypothesis will be replaced by the hypothesis generator 105 with three separate hypotheses: a hypothesis corresponding to a fault in the switches, a hypothesis corresponding to a fault in the wire harness, and a hypothesis corresponding to a fault in the controlled devices. That is, the control panel hypothesis corresponding to the device at the first level 322 is replaced by hypotheses corresponding to substructure of the device at the second level 324. Similarly, during subsequent fault isolation, any or all of the three hypotheses can be replaced by the substructure shown at the third level 326. Note that there are thirty separate components shown at the third level 326.

Figure 12C:
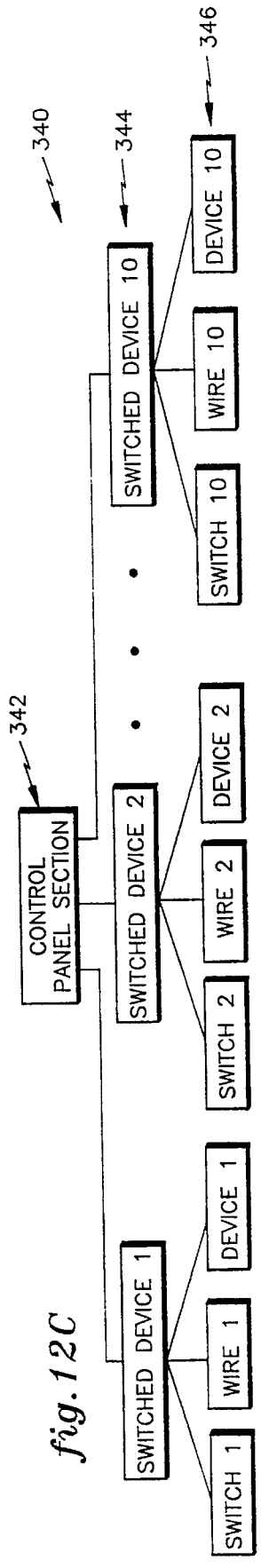
FIG. 12C is a schematic diagram of a model hierarchy.

FIG. 12C is a schematic diagram 340 of the same device of FIG. 12B except that the model hierarchy has been restructured. Although the diagram has a first level 342, a second level 344, and a third level 346, elements of the second and third levels 344, 346 are different from elements of the second and third levels 324, 326 of the diagram 320 of FIG. 12B. The user rearranges the hierarchy with the graphical user interface 302 by breaking and reforming parent/child relationships between components in the hierarchy until the desired configuration is attained. The restructuring shown in FIGS. 12B and 12C represents "regrouping", where components are regrouped into a new compound component in order to facilitate subsequent fault isolation of the machine being modeled. The new component does not necessarily represent any actual hierarchical level that exists in the machine. Note that when components are regrouped, no elementary component can become a child of one of the descendants of the component.

The hierarchy can be restructured in other ways. The user can "reparent" a component by removing the connection to the parent node of the component and connecting the component as a child of another node. Another technique includes automatic functional regrouping where components that are interconnected and hence functionally related are grouped into a single functional block. Automatic regrouping can also be performed for components that are related in ways other than being on the same functional path. Other automatic regrouping criteria include spatial proximity, functional similarity (e.g., two similar components intended to provide fault tolerance in the event that one of the components fails), and reliability. Other criteria, based on a variety of functional factors known to one of ordinary skill in the art, can also be used to automatically regroup components in the model. When a model hierarchy is restructured, the connections between elementary components are automatically maintained to ensure that the model continues to correctly reflect the actual connections between components of the machine being modeled.

Although the QRS software is shown as running on the PMA 30, and model construction is illustrated as running on a Sun SPARCstation 10, Model 41, it will be appreciated by those skilled in the art that either the QRS or the model construction can be supported on a variety of computing systems. Similarly, although the QRS software is shown to be written in Common Lisp, the invention may be practiced using any computer language capable of supporting the functionality required.

Even though qualitative physics is shown as being used for failure isolation and for model component debugging, it will be appreciated by those skilled in the art that qualitative physics can have many other applications beyond those illustrated herein. The invention can be used for failure isolation of any type of system that can be modeled qualitatively and/or quantitatively, and is not restricted to machines. Examples of such systems include, but are not limited to, economic systems, inventory systems, and physiological systems. Furthermore, aspects of the invention which relate to improvements to qualitative physics modeling (such as core predictions, dynamic assumption ordering, and confluence caching) have applications beyond those illustrated herein. The constraint propagation aspects of core predictions and dynamic assumption ordering can be used for invalidating inconsistent models (i.e., whenever a variable cannot take on any possible value without resulting in an inconsistent set of predictions). Similarly, qualitative physics modeling can be used for failure isolation without employing core predictions, dynamic assumption ordering, or confluence caching, although the resulting failure isolation system is likely to perform less than optimally. Although dynamic assumption ordering is illustrated herein as choosing variables which appear in the greatest number of target confluences for value substitution, it is possible to use a different scheme, such as choosing variables which appear in the second or third greatest number of target confluences, and still derive some of the benefits of dynamic assumption ordering.

The thresholds illustrated herein for the type I and type II tests of the intelligent test selection 100 may be changed. Similarly, the specific formulae used to calculate test scores, or the criteria used therein, may be modified without departing from the spirit and scope of the invention. The intelligent test selection 100 illustrated herein has other applications, beyond failure isolation, such as determining the best measurements for testing a component, and hence the placement of test points on the component, during the design of the component.

The ordering of the assumption of the number of simultaneous component failures illustrated herein (e.g. zero component failures, one component failure, two simultaneous component failures, etc.), and hence the ordering of hypothesis generation, may be modified without departing from the spirit and scope of the invention. Similarly, the step of prompting the user and determining the response whenever the number of components which are assumed to have simultaneously failed is increased, may be eliminated by having the QRS automatically increase the number and continue failure isolation without informing the user. The QRS can operate on a model comprised entirely of elementary components and hence does not require the model, contained in the model instance data element 106, to be hierarchical.

Even though a single application for the model builder is illustrated herein (i.e., using the model builder to construct the model instance data element 106 of the QRS), it will be appreciated by those skilled in the art that the model builder can have many other applications. A process different than the one illustrated herein can be used to create the model instance data element 106. Also, the QRS can operate on model instances wherein only a subset of the optimizations illustrated herein (e.g. constraint reduction, extraction of keywords, converting the data types of variables from Common Lisp lists of attributes to Common Lisp symbols, etc.) are performed on the model by the instantiator 308, but the result is likely to lead to a degradation in performance of the QRS. The QRS can also be configured to operate directly on the component data file 306, but such a system is likely to execute more slowly than the embodiment illustrated herein. The model instance can be tested using methods other than those illustrated herein.

Although the invention is illustrated by having the user perform tests, it is possible to automate the test result acquisition process by providing a data connection between the PMA 30 and the machine on which failure isolation is being performed and by having the QRS software request the machine for information via the data connection and by having the machine provide information also via the data connection. Also, it is possible to provide a QRS wherein no component health assessment tests or tests that cause a state change are used and the only tests that are provided are user observations. Furthermore, the QRS may provide failure isolation without prompting the user for additional input if, upon initialization with initial symptoms, the test results data element 94 contains a sufficient amount of information to isolate a machine failure to a single elementary component. Also, it is possible to provide failure isolation without the intelligent test selection 100 by using other methods (including random selection) to determine which tests for the user to perform, but the result is likely to cause the QRS to take a longer amount of time to isolate a machine failure. It is possible for one of ordinary skill in the art to combine many of the features described herein with features of the system disclosed in U.S. Pat. No. 5,138,694 to Hamilton.

Use of an agenda to optimize core predictions is not limited to making predictions on machine parameters for machine failure isolation. Use of enhanced core predictions is applicable to any task or process that involves reasoning that may be carried out on a qualitative model of a system. For example, embedded diagnosis, in which a processor is used to detect and diagnose failures in a system, may use core predictions with an agenda. Also, in the design of a device, predicting the behaviors of a design may use core predictions and an agenda. Similarly, core predictions may be applied to evaluating the failure modes and effects of a designed device, the testability of the designed device, and the sensor placement of a device. Computer-based training, in which core predictions may be used to describe the behaviors associated with a particular scenario, is also possible. Also, testing of a qualitative model may be carried out with the use of core predictions with an agenda.

Use of integrated qualitative/quantitative reasoning is not limited to performing machine failure isolation. The ability to combine qualitative and quantitative mathematical operations to predict the behaviors or characteristics of a system may be applied to the design of systems. For example, a predominantly qualitative analysis might be performed early in the design stages, where precise numerical information is not yet available. As the design becomes more detailed, more quantitative information would be applied to the model to provide more precise and detailed analysis. Also, integrated qualitative/quantitative reasoning may be used to evaluate characteristics of systems, such as the failure modes and effects of the system, the testability characteristics of the system, and the placement of sensors or inspection points. In addition, integrated qualitative/quantitative reasoning may be used for embedded diagnosis, where information of varying grain size (e.g., some precise numerical values and some qualitative values) is available for detecting the presence of failures and isolating them. Integrated qualitative/quantitative reasoning may also be applied in computer-based training, where varying levels of detail of a provided answer (e.g., very precise numerical values or general qualitative descriptions) may be required. Similarly, model testing may be carried out more effectively with integrated qualitative/quantitative reasoning by enabling the modeler to make both a detailed and general evaluation of a system.

Use of extended test procedures is not limited to performing machine failure isolation. Extended test procedures could be used when evaluating the failure modes and effects of a designed device, in that test procedures can setup a particular failure mode. For example, test procedures can initiate states by establishing values for variables. Use of extended test procedures is applicable to the tasks of testability analysis and sensor placement. For testability analysis, extended test procedures could be used to help determine the testability of the device making use of the dynamic costs of extended test procedures as well as both component health assessments and machine parameter observations. Extended test procedures could be used for sensor placement to help identify the locations where additional measurements obtained through sensor readings would facilitate diagnosis. Extended test procedures could be used for embedded diagnostics as the acquisition of machine parameter measurements and/or component health assessments could be automated. The information obtained could then be passed to the embedded diagnostic control to refine the action thereof. Extended test procedures could be used for computer based-training of maintenance personnel as to how to troubleshoot devices. In addition, extended test procedures could be used during model testing to ensure proper operation.

The use of reasoning in multiple machine configurations is not limited to performing machine failure isolation. Reasoning in multiple machine configurations could be used when evaluating the failure modes and effects of a designed device, in that particular machine configurations establish different failure modes and effects. For example, test procedures can initiate states by establishing values for variables, and state change may occur by changing control inputs during evaluation. Reasoning in multiple machine configurations is applicable to the tasks of testability analysis and sensor placement. For testability analysis and sensor placement, reasoning in multiple machine configurations allows the designed device to be analyzed in all of its machine configurations. This allows for complete testability analysis in all machine configurations and proper placement of sensors based on the particular machine configuration. Reasoning in multiple machine configurations could be used for embedded diagnostics as the acquisition test procedures could be automated and cause state transitions. The information obtained could then be passed to the embedded diagnostic control to refine the action thereof. Reasoning in multiple machine configurations could be used for computer-based training of maintenance personnel as to how to troubleshoot devices. In addition, reasoning in multiple machine configurations is applicable when testing a model to ensure proper operation for each configuration of the model.

Although hierarchy restructuring is described herein as facilitating failure isolation, it should be understood by those skilled in the art that the benefits of hierarchy restructuring are applicable to other applications that make use of machine models, including, but not limited to, testability analysis, preliminary design, machine operation and repair training, and embedded diagnostics. For testability analysis, hierarchy restructuring can provide a means to determine how testable a machine will be for different structurings of the qualitative physics model that will be used for failure isolation thereof. For preliminary design, hierarchy restructuring can provide a means to restructure a design model to allow the designer to better focus on groups of components of interest, which may differ from the groupings in an original design model. Similarly, for operation training, the model could be restructured to allow the trainee to focus on a particular aspect of machine behavior. For maintenance training, restructuring could be used in the same manner as described for failure isolation. For embedded diagnostics, hierarchy restructuring can provide a means of restructuring the model for improved embedded diagnostic performance and the automatic regrouping feature of hierarchy editing can provide a means to dynamically alter the model to adapt to changing operating conditions of the machine containing the embedded diagnostics. In addition to being applicable to the uses described herein, it is understood by those skilled in the art that hierarchy restructuring could be used to accelerate the testing of qualitative physics models by allowing components to be regrouped according to testing needs.

Although the applications compiler 317 is described herein as being used for machine failure isolation, it should be understood by those skilled in the art that the applications compiler 317 can be used for other purposes, including, but not limited to, embedded diagnostics, testability analysis, and training. For embedded diagnostics, the applications compiler 317 can provide a means of generating a high performance diagnostic module, which is often a requirement for embedded diagnostics given the limited computing resources typically available for embedded applications. For testability analysis, the applications compiler 317 can provide a means of estimating the performance of machine failure isolation on a machine before the machine is built. The applications compiler 317 can build the machine failure isolation module automatically and hence is useful in the context of the interactive nature of a preliminary design task. For training, the applications compiler 317 can provide a means for training a person on a failure isolation module that would be used in a production environment as well as in a training environment.

Although the invention has been shown and described with respect to exemplary embodiments thereof, it should be understood by those skilled in the art that various changes, omissions and additions may be made therein and thereto, without departing from the spirit and the scope of the invention.

We claim:

1. A method of using a processor to determine the presence of particular faults in a machine, comprising the steps of:

the processor estimating a time for performance for each of a plurality of machine test procedures by providing a summation, for each test procedure, of estimated times for performing portions of each of said test procedures, wherein portions of said machine test procedures which are unnecessary due to a present test configuration of the machine are not included in said summation;

the processor choosing a particular test procedure from said group of machine test procedures by selecting the one of said machine test procedures having a highest test score, said test score being inversely proportional to said summation;

the processor prompting a user to perform said particular test procedure and provide results thereof to the processor;

the processor generating a plurality of pending hypotheses wherein each hypothesis has associated therewith a set of confluences using variables and equations to describe operation of components of the machine which are assumed not to have failed;

the processor propagating values indicative of said test results through said confluences to produce a set of predictions for values of confluence variables;

the processor discarding hypotheses which produce an inconsistent set of predictions;

the processor saving hypotheses which produce a consistent set of predictions; and the processor indicating the presence of one or more particular machine faults in response to there remaining a single hypothesis corresponding to failure of one or more particular machine components.

2. A method of using a processor to determine the presence of particular faults in a machine, according to claim 1, wherein said prompting step includes the step of:

prompting the user to perform a component health assessment and enter the results thereof.

3. A method of using a processor to determine the presence of particular faults in a machine, according to claim 1, wherein said prompting step includes the step of:

prompting the user to perform an observation of a machine parameter and enter the results thereof.

4. A method of using a processor to determine the presence of particular faults in a machine, comprising the steps of:

the processor prompting a user to perform one of a plurality of machine test procedures and provide results thereof to the processor, said test procedure being created by applying a generic template to at least one of: a specific component and specific parameter;

the processor generating a plurality of pending hypotheses having associated therewith a set of confluences using variables and equations to describe operation of components of the machine which are assumed not to have failed;

the processor propagating values indicative of said test results through said confluences to produce a set of predictions for values of confluence variables;

the processor discarding hypotheses which produce an inconsistent set of predictions;

the processor saving hypotheses which produce a consistent set of predictions; and the processor indicating the presence of one or more particular machine faults in response to there remaining a single hypothesis corresponding to failure of one or more particular machine components.

5. A method of using a processor to determine the presence of particular faults in a machine, according to claim 4, wherein said prompting step includes the step of:

prompting the user to perform a component health assessment and enter the results thereof.

6. A method of using a processor to determine the presence of particular faults in a machine, according to claim 4, wherein said prompting step includes the step of:

prompting the user to perform an observation of a machine parameter and enter the results thereof.

7. A method of using a processor to determine the presence of particular faults in a machine, comprising the steps of:

the processor receiving machine signals indicative of machine test procedure results;

the processor generating a first set of pending hypotheses having associated therewith a set of confluences using variables and equations to describe operation of components of the machine which are assumed not to have failed;

the processor propagating said machine signals through said confluences to produce a set of predictions for values of confluence variables of a particular hypothesis by the steps of: selecting a subset of said variables, said subset containing unrestricted and partially restricted confluence variables of said hypothesis; temporarily assigning possible qualitative values to each variable of said subset to determine if one or more of said possible qualitative values results in a consistent set of predictions for said particular hypothesis; and restricting each variable of said subset to values which produce a consistent set of predictions;

the processor discarding hypotheses which produce an inconsistent set of predictions;

the processor saving hypotheses which produce a consistent set of predictions; and the processor indicating the presence of one or more particular machine faults in response to there remaining a single hypothesis corresponding to failure of one or more particular machine components.

8. A method of using a processor to determine the presence of particular faults in a machine, according to claim 7, wherein said selecting step includes the step of:

selecting variables that are likely to at least one of: be restricted and cause other variables to be restricted.

9. A method of using a processor to determine the presence of particular faults in a machine, according to claim 8, wherein said selecting step includes the step of:

the processor examining said unrestricted and partially restricted variables of said particular hypothesis and selecting variables that satisfy at least one of the following conditions: the variable appears in a precondition of a confluence, the variable appears in an unconditional confluence containing greater than two variables that are one of unrestricted and partially restricted, and the variable appears in a confluence postcondition with more than two variables that are one of unrestricted and partially restricted.

10. A method of using a processor to determine the presence of particular faults in a machine, according to claim 9, further comprising the step of:

the processor generating additional pending hypotheses having associated therewith a set of confluences using variables and equations to describe operation of components of the machine which are assumed not to have failed, said additional hypotheses corresponding to substructure of at least one of said first set of hypotheses, wherein said examining step is only performed on variables of said additional hypotheses than do not appear in said at least one of said first set of hypotheses corresponding to said additional hypotheses.

11. A method of using a processor to determine the presence of particular faults in a machine, according to claim 10, further comprising the step of:

the processor assigning values to variables of said additional hypotheses, said values being derived from values of corresponding variables from said at least one of said first set of hypotheses corresponding to said additional hypotheses.

12. A method of using a processor to determine the presence of particular faults in a machine, according to claim 10, wherein said selecting step includes the step of:

the processor examining additional variables of said additional hypotheses, said additional variables corresponding to variables from said at least one of said first set of hypotheses corresponding to said additional hypotheses, wherein said additional variables are one of: variables that have been restricted and recursive covariates thereof.

13. A method of using a processor to determine the presence of particular faults in a machine, according to claim 10, wherein said selecting step includes the step of:

the processor examining additional variables of said additional hypotheses, said additional variables corresponding to recursive covariates of variables of said additional hypotheses that do not appear in said at least one of said first set of hypotheses corresponding to said additional hypotheses.

14. A method of using a processor to determine the presence of particular faults in a machine, according to claim 13, further comprising the steps of:

the processor receiving additional machine signals indicative of machine test procedure results; and the processor performing said examining step only on variables and covariates thereof corresponding to said additional machine signals and implicants thereof.

15. A method of using a processor to determine the presence of particular faults in a machine, according to claim 7, wherein said propagating step further includes the steps of:

the processor determining implicants of each value assigned to a variable of said subset of variables; and the processor restricting other variables of said confluences according to a union of said implicants.

16. A method of using a processor to determine the presence of particular faults in a machine, according to claim 7, wherein said selecting step includes the step of:

the processor examining only said unrestricted and partially restricted confluence variables and covariates thereof that had been restricted on a most recent previous iteration.

17. A method of using a processor to determine the presence of particular faults in a machine, according to claim 7, further including the step of:

the processor discarding said particular hypothesis in response to there being no possible values that can be assigned to a variable of said subset of variables resulting in a consistent set of predictions.

18. A method of using a processor to determine the presence of particular faults in a machine, comprising the steps of:

the processor receiving machine signals indicative of machine test procedure results;

the processor generating a first set of pending hypotheses having associated therewith a set of confluences using variables and equations to describe operation of components of the machine which are assumed not to have failed;

the processor assigning to confluence variables of a particular hypothesis values that correspond to said machine signals;

the processor propagating values for fully restricted and partially restricted confluence variables through said confluences to further restrict values of other variables of said confluences;

the processor discarding hypotheses which produce an inconsistent set of predictions;

the processor saving hypotheses which produce a consistent set of predictions; and the processor indicating the presence of one or more particular machine faults in response to there remaining a single hypothesis corresponding to failure of one or more particular machine components.

19. A method of using a processor to determine the presence of particular faults in a machine, comprising the steps of:

the processor receiving machine signals indicative of machine test procedure results;

the processor generating a first set of pending hypotheses having associated therewith a set of confluences using variables and equations to describe operation of components of the machine which are assumed not to have failed;

the processor propagating said machine signals through said confluences to produce a set of predictions for values of confluence variables of a particular hypothesis, wherein at least one of said values is a quantitative value;

the processor discarding hypotheses which produce an inconsistent set of predictions;

the processor saving hypotheses which produce a consistent set of predictions;

the processor indicating the presence of one or more particular machine faults in response to there remaining a single hypothesis corresponding to failure of one or more particular machine components; and the processor accessing a global landmark ordering to correlate quantitative values and qualitative values of said confluence variables.

* * * * *

UNITED STATES PATENT AND TRADEMARK OFFICE
CERTIFICATE OF CORRECTION

PATENT NO.  : 5,522,014
DATED       : May 28, 1996
INVENTOR(S) : Clark, et al.

It is certified that error appears in the above-indentified patent and that said Letters Patent is hereby corrected as shown below:

Title page  item [54] and col. 1, line 1,

In the title of the patent, change "INTERGRATED" to "INTEGRATED".

In Claim 10, Column 41, Line 14, change "than" to "that".

In Claim 14, Column 41, Line 46, change "13" to "8". Based on the USPTO's renumbering of the claims, Claim 14 should depend from Claim 8.

Signed and Sealed this

Twenty-ninth Day of July, 1997

Attest:

BRUCE LEHMAN

Attesting Officer        Commissioner of Patents and Trademarks